United States Patent [19]

Honda et al.

[11] Patent Number: 5,400,213
[45] Date of Patent: Mar. 21, 1995

[54] ELECTRONIC DEVICE HAVING DETACHABLE KEYBOARD CLAMPED BY A ROTATABLE DISPLAY WHEN CLOSED OVER THE KEYBOARD

[75] Inventors: Masami Honda; Masaaki Takada; Yousuke Miura, all of Tokyo, Japan

[73] Assignee: Kabushiki Kaisha Toshiba, Japan

[21] Appl. No.: 267,853

[22] Filed: Jun. 29, 1994

Related U.S. Application Data

[63] Continuation of Ser. No. 166,289, Dec. 13, 1993, abandoned, which is a continuation of Ser. No. 964,039, Oct. 20, 1992, abandoned.

[30] Foreign Application Priority Data

Jan. 10, 1992 [JP] Japan .................. 4-002935

[51] Int. Cl.$^6$ ............................ H05K 7/12; G06F 1/16
[52] U.S. Cl. ............................................. 361/680
[58] Field of Search ................ 312/223.2; 341/22; 364/708.1; 248/917-923; 361/679-683

[56] References Cited

U.S. PATENT DOCUMENTS

| | | | |
|---|---|---|---|
| D. 294,029 | 2/1988 | Nahiyama et al. ............... | D14/106 |
| D. 306,433 | 3/1990 | Mitchell ............................ | D14/106 |
| D. 308,194 | 5/1990 | Messerschmidt et al. . | |
| 4,379,336 | 4/1983 | Yamamoto et al. . | |
| 4,456,315 | 6/1984 | Markley et al. . | |
| 4,704,604 | 11/1987 | Fuhs . | |
| 4,736,332 | 4/1988 | Crease . | |
| 4,769,764 | 9/1988 | Levanon ....................... | 364/708.1 X |
| 4,852,032 | 7/1989 | Matsuda et al. ................. | 361/680 |
| 4,903,221 | 2/1990 | Krenz .............................. | 364/708.1 X |
| 4,903,222 | 2/1990 | Carter et al. .................... | 364/708.1 X |
| 4,980,676 | 12/1990 | Nomura et al. ................. | 361/680 |
| 4,980,848 | 12/1990 | Griffin et al. .................... | 361/680 |
| 5,034,858 | 7/1991 | Kawamoto et al. ............. | 361/680 |

FOREIGN PATENT DOCUMENTS

| | | |
|---|---|---|
| 56-45936 | 4/1981 | Japan . |
| 60-160418 | 8/1985 | Japan . |
| 61-19829 | 2/1986 | Japan . |
| 61-42619 | 3/1986 | Japan . |
| 686381 | 5/1986 | Japan . |
| 61-125082 | 8/1986 | Japan . |
| 62-113303 | 5/1987 | Japan . |
| 62-177611 | 8/1987 | Japan . |
| 62-257512 | 11/1987 | Japan . |

*Primary Examiner*—Michael W. Phillips
*Attorney, Agent, or Firm*—J. William Wigert, Jr.

[57] ABSTRACT

A personal computer includes a main body having a stepped portion formed in a front portion of an upper surface of the main body. The stepped portion has a bottom surface lower in level than the upper surface. A keyboard is detachably placed in the stepped portion so that when a display rotatably mounted on the main body is rotated to its closed position, it is clamped between the display and the bottom surface of the stepped portion. A protruding portion protrudes from the bottom surface of the stepped portion and extends through a through hole formed in the keyboard so to restrain the movement of the keyboard when the keyboard is mounted in the stepped portion. The protruding portion has an abutment portion which is brought into contact with the display rotated to the closed position and supports the display. When the display is rotated to the closed position, a hook on the display engages an engagement portion formed in the protruding portion.

9 Claims, 26 Drawing Sheets

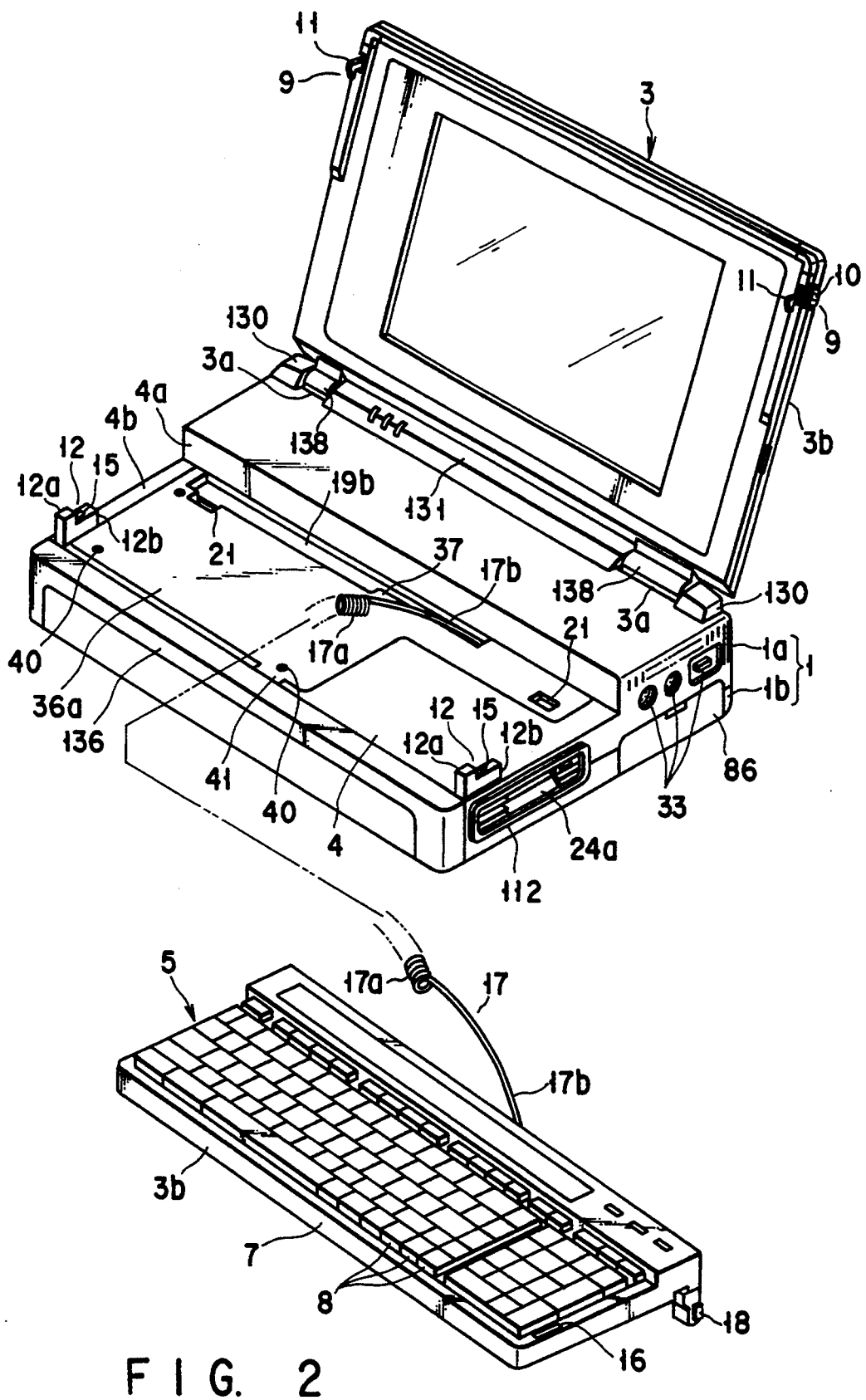
F I G. 2

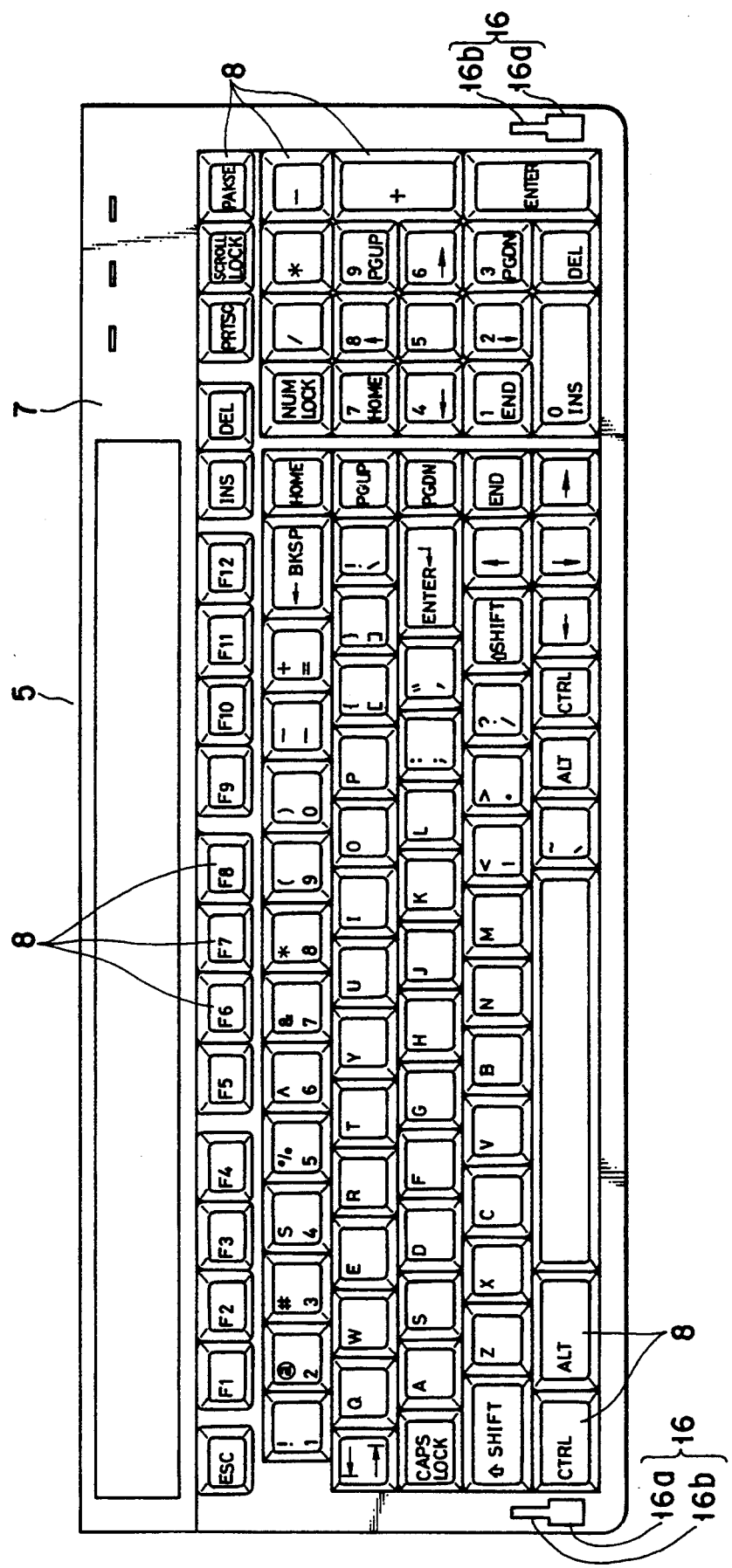
F I G. 4

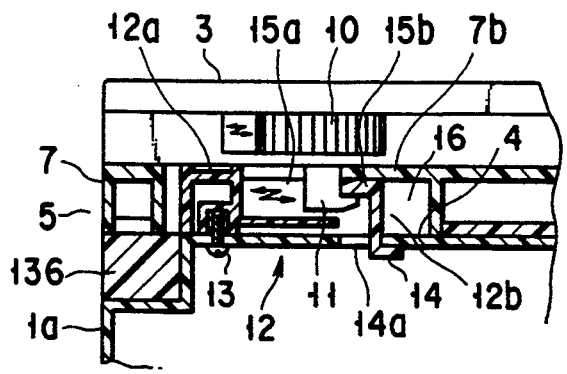
F I G. 7A
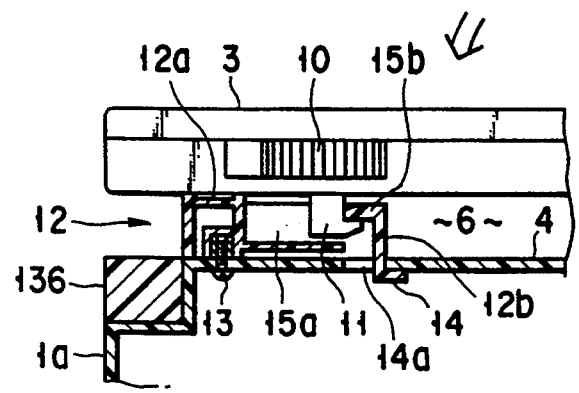
F I G. 7B
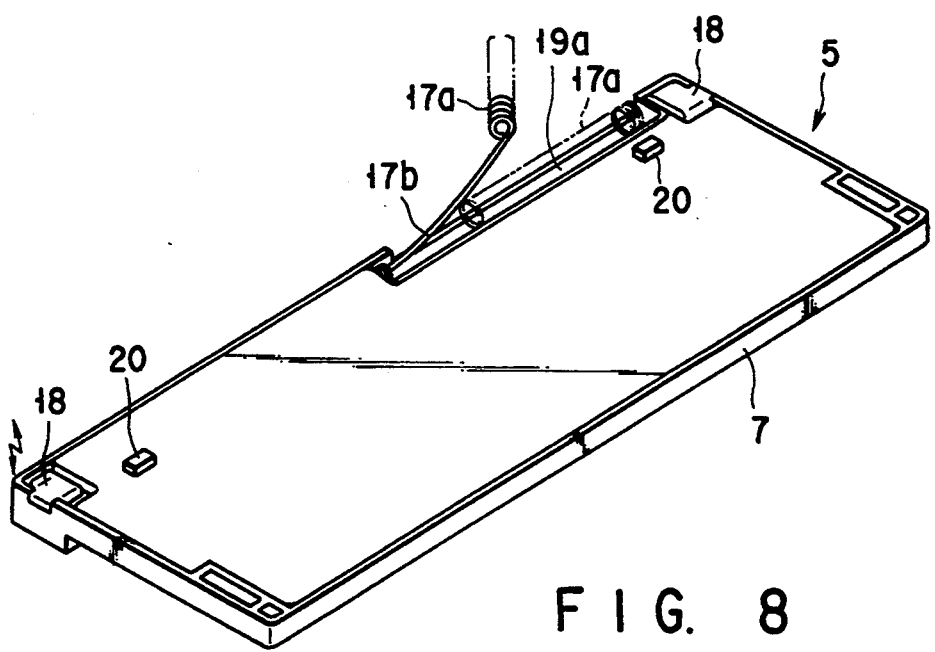
F I G. 8

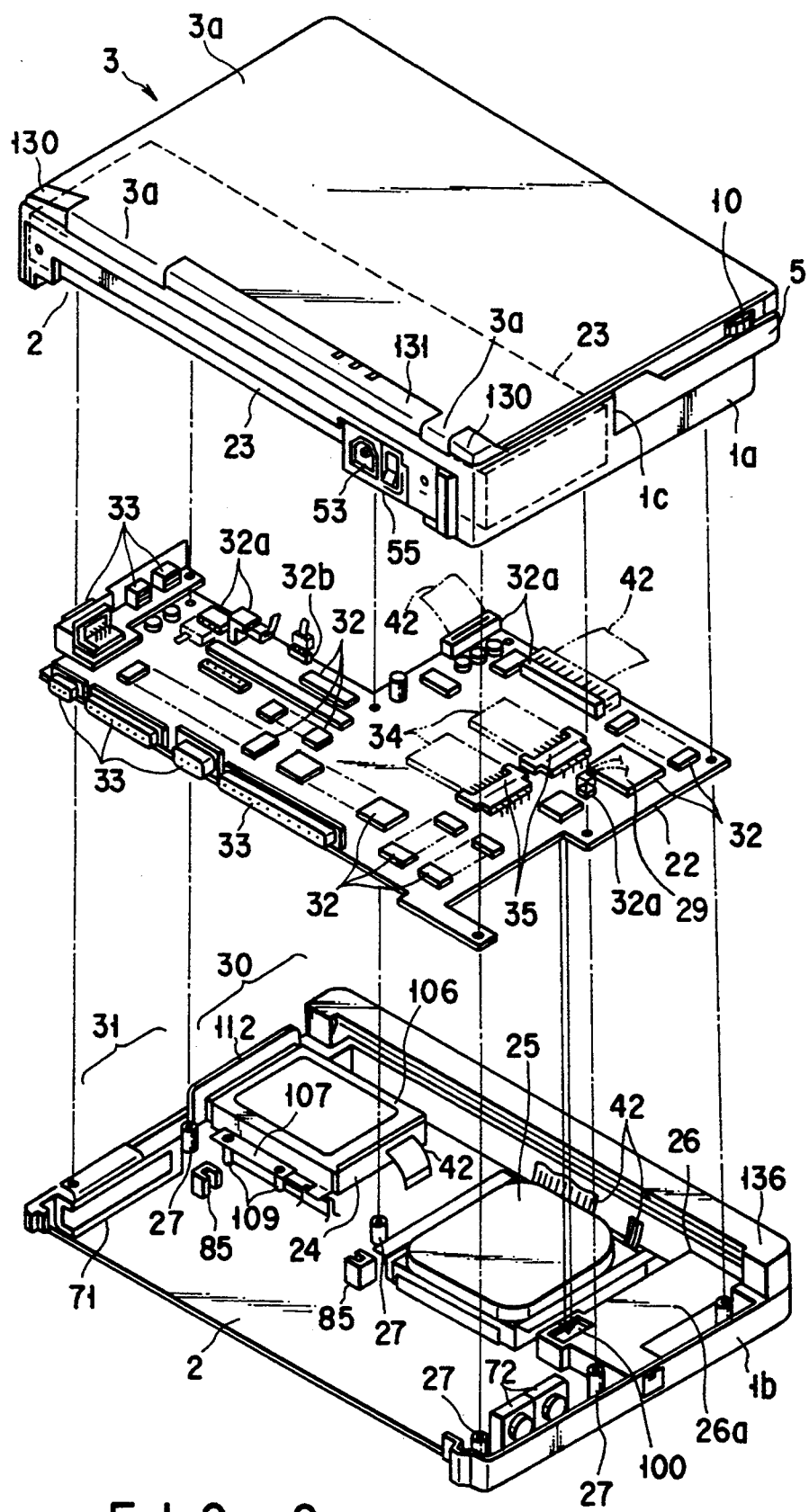
F I G. 9

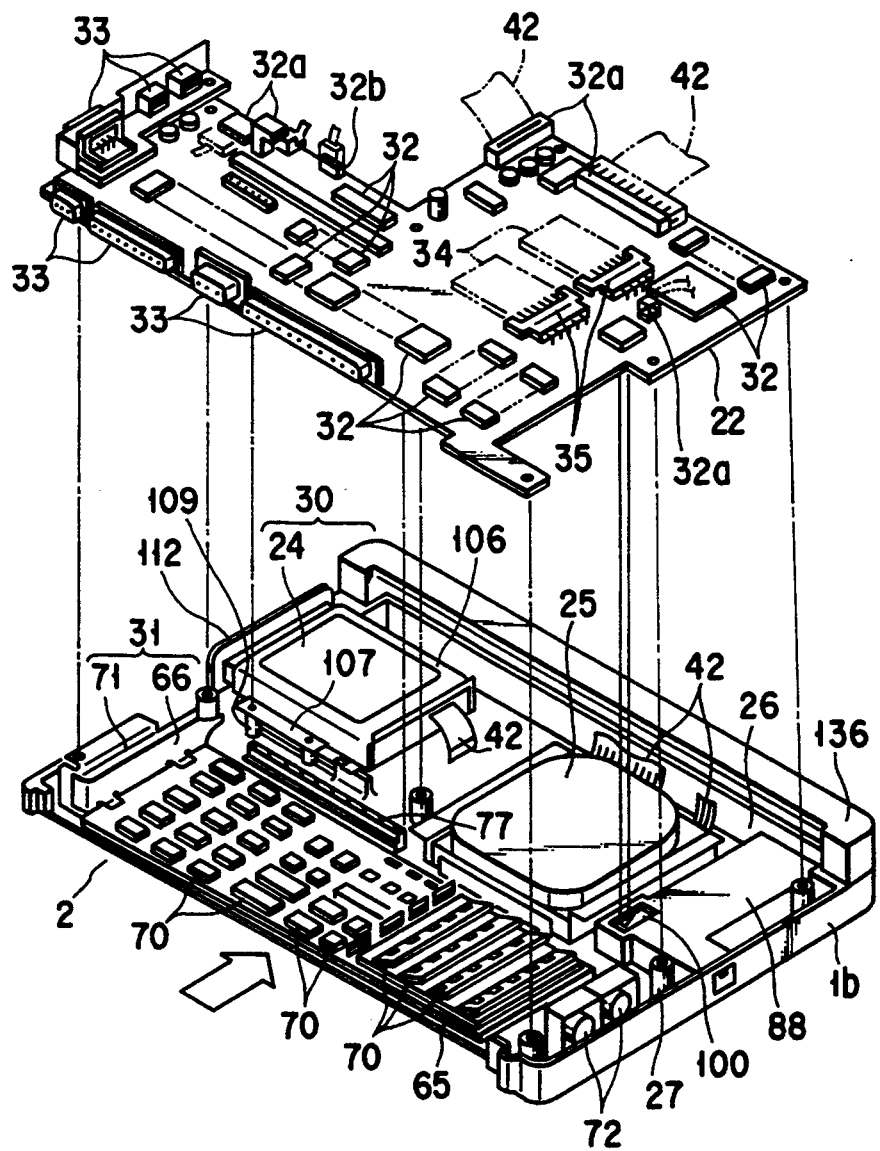
F I G. 14

1

ELECTRONIC DEVICE HAVING DETACHABLE KEYBOARD CLAMPED BY A ROTATABLE DISPLAY WHEN CLOSED OVER THE KEYBOARD

This is a continuation of application Ser. No. 08/166,289, filed on Dec. 13, 1993, now abandoned, which is a continuation of application Ser. No. 07/964,039, filed on Oct. 20, 1992, now abandoned.

BACKGROUND OF THE INVENTION

1. Field of the Invention

The present invention relates to an electronic device having a keyboard which can be used while it is separated from the main body.

2. Description of the Related Art

As a portable personal computer, a computer having a keyboard which can be used while being detached from the main body to improve handiness is known.

As a personal computer of this type, a computer having the following arrangement is known. In this computer, a front portion of the upper surface of the box-like flat main body is set to be lower in level than the remaining portion so as to form a stepped portion, and a keyboard is detachably mounted in this stepped portion. When the display is closed while the keyboard is mounted in the stepped portion, the keyboard is clamped between the display and the stepped portion.

According to the computer having the above-described arrangement, when the display is closed while the keyboard is mounted in the stepped portion of the main body, and these components are to be carried as one unit, the keyboard may slide down outward from the stepped portion of the main body. For this reason, a computer of this type uses a latch mechanism for locking the display in a closed state, thereby holding the keyboard in the stepped portion.

According to such a conventional holding structure, the latch mechanism of the display has a long hook extending to an upper surface portion of the stepped portion of the main body, and an engaging/receiving portion with/from which the hook can be freely engaged/disengaged is formed at the upper surface portion, of the main body, which corresponds to the hook. In addition, a through hole is formed in the keyboard to allow the hook to slidably pass therethrough. When the display is closed while the keyboard is placed in the stepped portion, the distal end portion of the hook passes through the through hole of the keyboard to be engaged with the engaging/receiving portion with this operation, the movement of the keyboard is restrained by the hook together with the lock of the display.

Although no problems are posed in such a holding structure while the keyboard is mounted in the stepped portion, the following problem may be caused when the display is closed while the keyboard is separated from the main body. The closed display is locked upon engagement between the hook and engaging/receiving portion. However, the corner portion or shoulder portion of the stepped portion is brought into contact with an intermediate portion of the display in the forward-/backward direction because the keyboard is not mounted in the stepped portion. For this reason, if the keyboard is pivoted to close it, a large stress acts on the display such that the display is bent into an L shape while the intermediate portion, located in the forward-/backward direction, which is in contact with the corner portion of the stepped portion serves as a fulcrum. This stress may damage the display. Especially in recent years, since the display has been reduced in profile and rigidity with a decrease in weight, the possibility of damaging the display is high.

SUMMARY OF THE INVENTION

The present invention has been made in consideration of the above situation and has as its object to provide an electronic device which can reliably hold a keyboard in a stepped portion and prevents damage to a display.

In order to achieve the above object, according to the present invention, there is provided an electronic device comprising: a rectangular main body including an upper surface and a stepped portion formed in a front portion of the upper surface, the stepped portion having a bottom surface lower in level than the upper surface and substantially parallel to the upper surface; a display arranged on the main body and rotatable between a closed position where the display covers the upper surface and the stepped portion, and a opened position where the upper surface and the stepped portion are exposed; a keyboard detachably placed in the stepped portion so that when said display is rotated to the closed position, the keyboard is clamped between the display and the bottom surface of the stepped portion; holding means for holding the keyboard in the stepped portion; and lock means for locking the display in the closed position. The holding means includes a through hole formed in the keyboard, and a protruding portion protruding from the bottom surface of the stepped portion so as to extend through the through hole and restrain the movement of the keyboard when the keyboard is mounted in the stepped portion. The protruding portion has an abutment portion for abutting against the display rotated to the closed position. The lock means includes an engagement portion provided at the protruding portion, and a hook provided at the display, for engaging the engagement portion when the display is rotated to the closed position.

According to the electronic device having the above-described arrangement, when the keyboard is mounted in the main body to be assembled into one portable unit with the display closed, the display is closed after the keyboard is placed in the stepped portion formed in the front portion of the main body. With this operation, the protruding portion protruding from the bottom surface of the stepped portion is inserted in the through hole in the keyboard and restrains the movement of the keyboard. At the same time, the hook of the display is engaged with the engagement portion of the protruding portion to lock the display, while the keyboard is clamped between the bottom surface of the stepped portion and the display to be restrained.

When the display of the main body is to be closed without mounting the keyboard in the main body to use an external display unit, the display is closed while the keyboard is detached from the stepped portion with this operation, the distal end portion of the hook of the display is engaged with the engagement portion of the protruding portion. At this time, the abutment portion of the protruding portion is brought into contact with the front portion of the display in the closed state and supports the front portion of the display, thereby reducing a stress which acts to bend the display into an L shape.

Even if, therefore, the display is closed and locked while the keyboard is not mounted in the stepped portion, the display is not damaged.

In addition, according to the present invention, there is provided an electronic device comprising: a rectangular main body having an upper surface; a display arranged on the main body and rotatable between a closed position where the display covers the upper surface and an opened position where the upper surface is exposed; and a circuit board arranged in the main body to oppose the upper surface, the circuit board having a holding portion for detachably holding a CPU. The main body has an opening formed in the upper surface, for allowing access to the holding portion, and a lid detachably disposed on the upper surface to close the opening.

According to the electronic device having the above-described arrangement, when the CPU is to be attached/detached to/from the holding portion of the circuit board, the lid is removed to allow an attaching-/detaching operation to be externally performed through the opening with this structure, CPU and the like can be easily replaced without dissembling the main body.

Furthermore, according to the present invention, there is provided an electronic device comprising a substantially rectangular main body having a bottom wall and a rear wall having an opening; a circuit board arranged in the main body to oppose the bottom surface with a predetermined distance, the circuit board and the bottom surface defining a mounting space therebetween; an expansion board detachably arranged in the mounting space through the opening; a connector fixed and electrically connected to the circuit board, and located between the circuit board and the bottom wall, the connector having a connecting portion opposing the opening and allowing the expansion board to be connected thereto, and a lower end portion in contact with the bottom wall, thereby supporting the circuit board; and restraining means for restraining movement of the connector with respect to the bottom wall, the restraining means having a first engaging portion formed on the lower end portion of the connector, and a second engaging portion formed on the bottom wall and engaged with the first engaging portion.

According to the electronic device having the above-described arrangement, when the expansion board is to be mounted in the main body, it is inserted in the mounting space through the opening and is connected to the connector. In the connecting operation, a large external force acts on the connector. However, since the movement of the connector with respect to the bottom wall of the main body is restrained by the first and second engaging portions, an excessive force does not act on the connecting portion between the connector and the circuit board, thereby reliably preventing disconnection of the connector, damage to the connector, and the like.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIGS. 1 to 29 show a portable computer according to an embodiment of the present invention, in which FIG. 1 is a perspective view showing the outer appearance of the computer in a state wherein a display is set upright;

FIG. 2 is a perspective view showing the outer appearance of the computer with a keyboard detached therefrom;

FIG. 3 is a perspective view showing the computer in a state wherein the display is closed with the keyboard separated from the main body;

FIG. 4 is a plan view showing the arrangement of the key tops of a keyboard portion;

FIG. 5 is a perspective view showing the computer in a state wherein the display is closed with the keyboard mounted in the main body;

FIG. 6 is an exploded perspective view showing a latch mechanism for locking/unlocking the display, and portions around a spacer;

FIG. 7A is a sectional view showing a state wherein the display is locked by the latch mechanism while the keyboard is mounted in a stepped portion;

FIG. 7B is a sectional view showing a state wherein the display is locked by the latch mechanism while the keyboard is not mounted in the stepped portion;

FIG. 8 is a perspective view showing the lower surface of the keyboard;

FIG. 9 is an exploded perspective view showing the overall computer;

FIG. 11 is a perspective view showing the outer appearance of the computer in a state wherein a lid is removed from the stepped portion;

FIG. 12 is an exploded perspective view showing the relationship between a main circuit board incorporated in the computer main body and an upper cover;

FIG. 13 is a perspective view showing the lower surface portion of the computer main body and an expansion board;

FIG. 14 is a perspective view showing the interior of the computer in which the expansion board is mounted;

FIG. 15 is a perspective view showing the lower surface portions of the expansion board and the main circuit board;

FIG. 16 is a sectional view of a computer rear portion, illustrating a mounting region of the expansion board;

FIG. 17 is a perspective view showing the structure of a connector for electrically connecting the expansion board to the main circuit board;

FIG. 18 is a perspective view showing a power supply unit suspended from the upper case;

FIG. 19 is a perspective view showing a suspending structure of the power supply unit together with a harness guide structure of the display;

FIG. 20 is an exploded perspective view showing an upper portion of the power supply unit;

FIG. 21 an exploded perspective view showing a lower portion of the power supply unit;

FIG. 22 is a perspective view showing the mounting structure of a modem with respect to the computer main body;

FIG. 23 is an exploded perspective view of the modem;

FIG. 24 is an exploded perspective view showing the mounting structure of an FDD incorporated in the computer main body;

FIG. 25 is an exploded perspective view showing a CDD and an HDD which are to be mounted in the computer main body instead of an FDD;

FIG. 26 is an exploded perspective view showing the mounting structures of the CDD and the HDD with respect to the computer main body;

FIG. 28 is a perspective view showing the structures of a hinge of the display and an opening/closing switch; and FIG. 29 is an enlarged perspective view of the structure of the opening/closing switch.

DETAILED DESCRIPTION OF THE PREFERRED EMBODIMENT

The present invention will be described below with reference to an embodiment shown in FIGS. 1 to 28.

Figure 1:
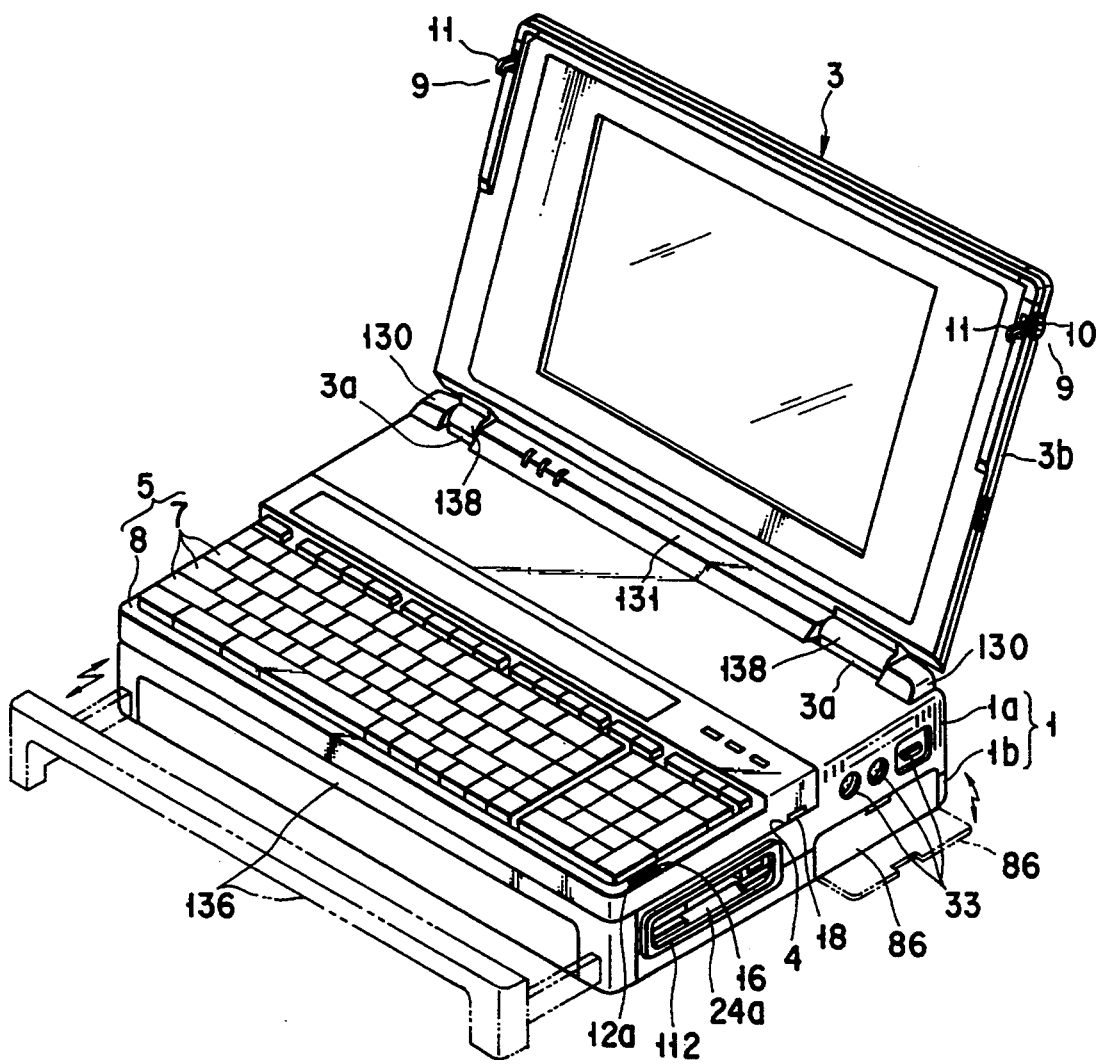

FIG. 1 shows the outer appearance of a portable personal computer according to an embodiment of the present invention is applied. The computer has a case 1 as a main body. The case 1 is formed by combining an upper case 1a with a lower case 1b to have a flat box-like shape. A rectangular opening 2 (FIG. 13) allowing an expansion board to be inserted therein is formed throughout a rear wall of the case 1. Referring to FIG. 1, reference numeral 136 denotes a handle provided at a front portion of the case 1 and drawable so as to allow a user to carry the computer main body.

Leg portions 3a of a flat display 3 are pivotally supported on the rear end of the upper surface of the case 1 so that the display 3 is mounted on the case 1 to be rotatable between a closed position where the display covers the entire upper surface of the case 1, and an opened position where the upper surface of the case 1 is exposed.

A stepped portion 4 is formed on a front portion of the upper surface of the case 1. As shown in FIG. 2, for example, the stepped portion 4 is formed on the front portion of the case 1 with the central line of the case 1 in the forward/backward direction serving as a boundary. The bottom surface 4b of the stepped portion 4 is lower in level than the upper surface of the rear portion of the case 1. The rear end of the bottom surface 4b of the stepped portion 4 is continuous with the front end of the upper surface of the rear portion of the case 1 through an vertical upright wall 4a.

Figure 3:
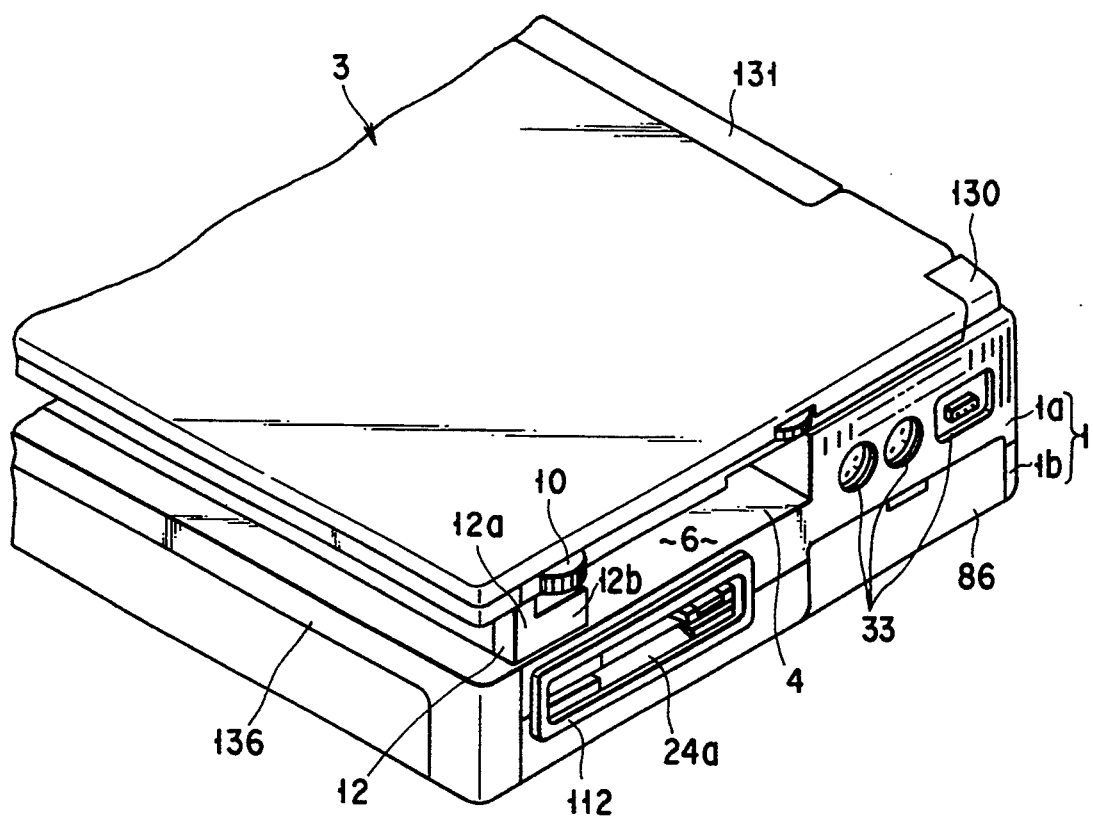
Figure 5:
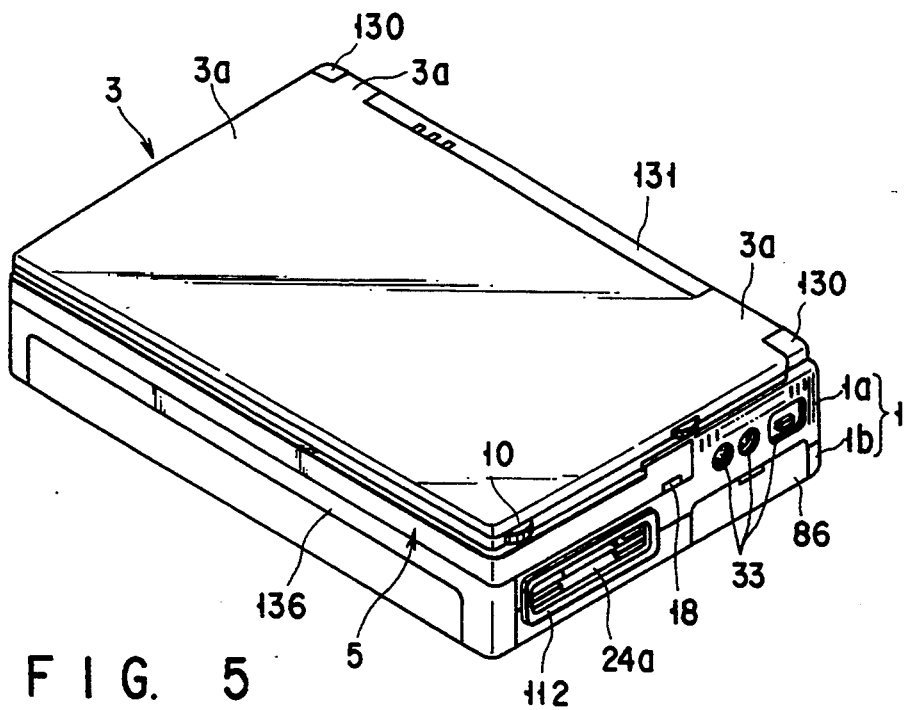

A keyboard 5 is fitted to the stepped portion 4 to fill the stepped portion 4. More specifically, as shown in FIG. 3, a flat stepped space 6 is defined between the display 3 in the closed state and the stepped portion 4. As shown in FIGS. 1, 2 and 4, the keyboard 5 comprises a flat box-like keyboard main body 7 corresponding to the shape of the stepped space 6, and a large number of types of key tops 8 arranged on the upper surface of the main body in a predetermined manner. As shown in FIG. 5, when the display 3 is closed after the keyboard 5 is placed in the stepped portion 4, the keyboard 5 can be stored in the stepped space 6 while it is clamped between the display 3 and the stepped portion 4.

The keyboard 5 is held in the stepped portion 4 by means of latch mechanisms 9 of the display 3, i.e., latch mechanisms for locking/unlocking the display 3 to/from the case 1.

Figure 6:
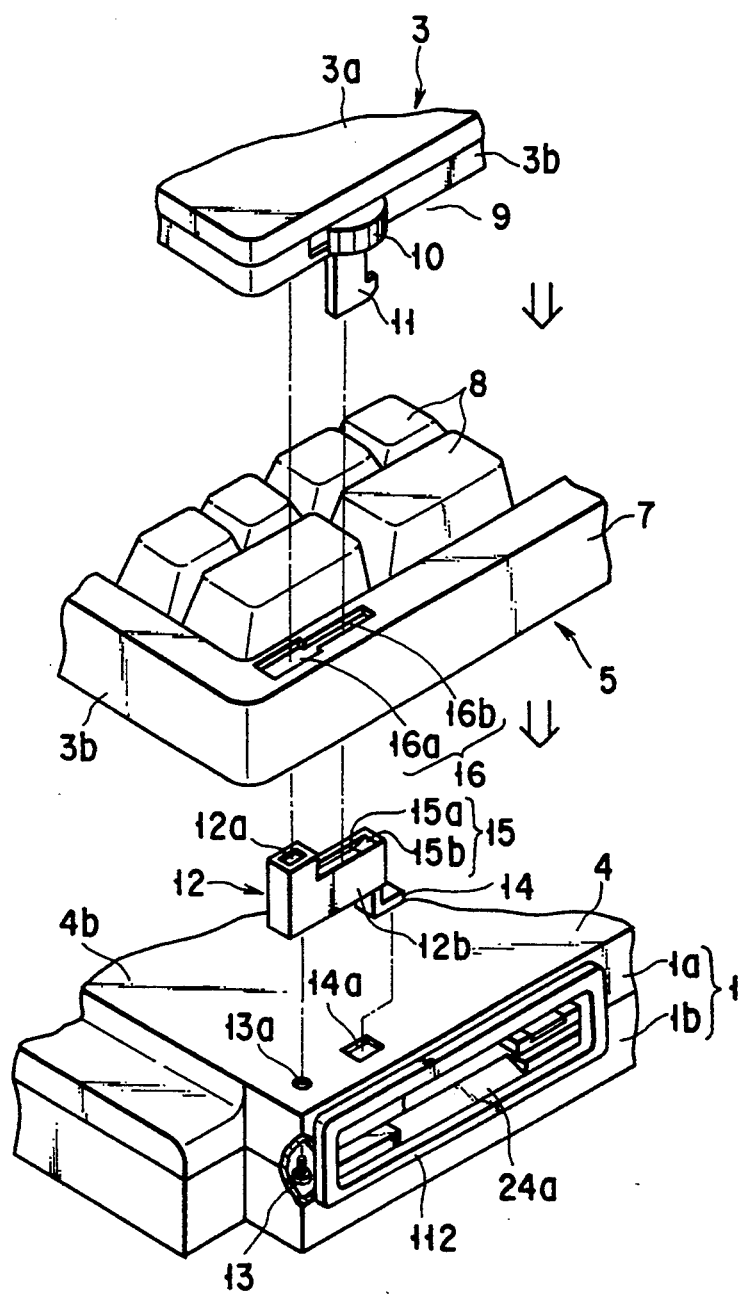

This holding structure will be described below. As shown in FIGS. 1, 2, and 6, a pair of latch mechanisms 9 are respectively provided on front portions on the two sides of a flat casing 3b in the direction of width, which casing constitutes part of the display 3. These latch mechanisms 9 have operation knobs 10 respectively provided on the two sides of the front end portions of the casing 3b to be slidable in the forward/backward direction, and a pair of hooks 11 which slide in the forward/backward direction of the casing 3b in accordance with sliding operations of the operation knobs 10. Each hook 11 protrudes from the casing 3b toward the case 1.

A pair of spacers 12 respectively project from the bottom surface 4b of the stepped portion 4 at positions corresponding to the positions of the hooks 11. Each spacer 12 is constituted by a substantially L-shaped block. Each spacer 12 is fixed to the bottom surface 4b of the stepped portion 4 such that the taller portion of the spacer is located at the front end side of the case 1. As shown in FIGS. 6 and 7A, each spacer 12 is fixed to the stepped portion 4 by means of a screw 13 which is screwed into the spacer 12 through a through hole 13a formed in the bottom surface 4b and a hook 14 extending from the spacer which is fitted in an opening 14a formed in the bottom surface 4b.

The front portion of each spacer 12, which is taller than the remaining portion, constitutes an abutment portion 12a. The height of this abutment portion 12a is set to be equal to the thickness of the keyboard main body 7. In addition, the rear portion of each spacer 12, which is lower than the front portion, constitutes a rectangular parallelepiped engaging portion 12b. The height of this engaging portion 12b is set in accordance with the distance between the lower surface of the keyboard main body 7 to the lower surface of an upper wall 7b of the keyboard main body 7.

An opening 15a in which the hook 11 can be inserted is formed in the upper end wall of each engaging portion 12b. In addition, an extended portion 15b which can be engaged/disengaged with/from the distal end of a corresponding one of the hooks 11 extends from an edge portion of each opening 15a to be tapered toward the opening. The opening 15a and the extended portion 15b constitute an engagement portion 15 according to the present invention.

A pair of through holes 16 serving as storing portions of the present invention are formed in the keyboard main body 7 at the positions corresponding to the positions of the pair of spacers 12. Each through hole 16 has a hole portion 16a through which the entire abutment portion 12a of the corresponding spacer 12 is caused to extend, and a hole portion 16b which opposes the opening 15a in the engaging portion 12b of the spacer 12. These hole portions 16a and 16b communicate with each other. With this structure, when the keyboard 5 is placed in the stepped portion 4 of the case 1 while the spacers 12 are fitted or inserted in the through holes 16, the upper end face of the abutment portion 12a of each spacer 12 is located at the same level as that of the upper surface of the keyboard main body 7, and the upper end face of each engaging portion 12b is brought into contact with the lower surface of the upper wall 7b of the keyboard main body 7.

In this state, when the display 3 is rotated to the closed position where the display 3 covers the upper surface of the keyboard main body 7, the distal end portions of the hooks 11 of the display 3 are inserted in the openings 15a in the spacers 12 and are engaged with the extended portions 15b, thus locking the display 3 in the closed position, as shown in FIGS. 5 and 7A. With this operation, the keyboard 5 is clamped between the bottom surface 4b of the stepped portion 4 and the display 3 and is held in the stepped portion 4 so as not be moved.

Even if the display 3 is rotated to the closed position while the keyboard 5 is not mounted in the stepped portion 4, the display 3 can be locked to the closed position without applying a bending stress to the display 3. More specifically, since the height of the abutment portion 12a of each spacer 12 is set in accordance with the thickness of the keyboard main body 7, even if the display 3 is closed and locked while the keyboard 5 is detached from the stepped portion 4, the upper end face of the abutment portion 12a is brought into contact with the inner surface of the display 3 to support the distal end portion of the display 3. For this reason, the display 3 can be received by the spacers 12 in the same state as when the keyboard 5 is mounted in the stepped portion 4.

In this embodiment, the storing portion is formed of the through hole 16. However, the storing portion may be comprised of a notch formed in the side edge portion of the keyboard main body 7.

As shown in FIG. 2, the keyboard 5 is electrically connected to the case 1 side through a curled cord 17 extending through the bottom surface 4b of the stepped portion 4. With this structure, the computer can be operated in a state wherein the keyboard 5 is detached from the stepped portion 4 and is placed at a position some distance away from the case 1, at which a key operation can be easily performed. In addition, as shown in FIGS. 2 and 8, a pair of collapsible tilt legs 18 are formed on rear portions of the keyboard 5 to allow the user to operate the keyboard 5 in a tilted state. In order to prevent the curled cord 17 from becoming a hindrance when the keyboard 5 is mounted in the stepped portion 4, elongated recess portions 19a and 19b for storing a curled portion 17a and a straight cord portion 17b of the curled cord 17 are respectively formed in a rear portion of the lower surface of the keyboard main body 7 and a corresponding portion of the bottom surface 4b of the stepped portion 4. When the keyboard 5 is placed in the stepped portion 4 in the predetermined manner, these recess portions 19a and 19b oppose each other to form a cylindrical space so as to store the entire curled cord 17 therein.

Referring to FIGS. 2 and 8, reference numeral 20 denotes guide legs extending from portions on the two sides of the lower surface of the keyboard main body 7 in the direction of width; and 21, guide recesses formed in the bottom surface 4b of the stepped portion 4 in correspondence with the guide legs 20. When the guide lens 20 are fitted in the guide recess portions 21, the keyboard 5 can be positioned at a predetermined position in the stepped portion 4.

when the computer having the above-described arrangement is to be assembled into one portable unit from a state wherein the keyboard 5 is separated from the computer main body 7 (the display 3 is set upright), as shown in FIG. 2, the keyboard 5 is placed on the bottom surface of the stepped portion 4 of the case 1 in the predetermined manner while the through holes 16 are fitted on the spacers 12, as shown in FIG. 1. With this operation, as shown in FIG. 7A, the upper end faces of the abutment portions 12a of the spacers 12 are located at the same level as that of the upper surface of the keyboard main body 7, and the upper end faces of the engaging portions 12b of the spacers 12 are brought into contact with the lower surface of the upper portion wall 7b of the keyboard main body 7.

Subsequently, the open display 3 is pivoted to close it. With this operation, as shown in FIG. 7B, as the distal end portions of the hooks 11 of the display 3 reach the extended portions of the spacers 12, they are displaced in the forward/backward direction to be engaged with the extended portions 15b, respectively. As a result, the display 3 is locked by the hooks 11, and at the same time, the keyboard 5 mounted in the stepped portion 4 is restrained so as not to be moved in the forward/backward direction and the upward/downward direction, thus assembling one portable unit, as shown in FIG. 5.

When the display 3 is to be closed without assembling the keyboard 5 in the case 1, as in the case wherein the computer is connected to an external display unit such as a CRT, the display 3 is pivoted to close it with the keyboard 5 detached from the stepped portion 4. With this operation, the distal end portions of the hooks 11 of the display 3 are engaged with the engaging portions 12b of the spacers 12, which protrude from the upper surface of the stepped portion 4.

At this time, since the protrusion size from the bottom surface of each spacer 12 to the upper end face of the abutment portion 12a corresponds to the distance between the display 3 and the bottom surface 4b of the stepped portion 4 in the closed state, the front portion of the closed display 3 is received by the spacers 12 at the same level as that of the other upper surface portion of the case 1, as shown in FIGS. 3 and 7B. This structure prevents the generation of a stress to bend the display 3 into an L shape. Therefore, even if the display 3 is closed and locked while the keyboard 5 is not mounted in the stepped portion 4, the display 3 is not damaged.

An electronic device mounting structure in the case 1 will be described with reference to FIGS. 9 to 12.

As shown in FIG. 9, a main circuit board 22 is arranged in the case 1 at an intermediate portion in the direction of height. In case 1, a power supply unit 23 is arranged on an upper side of the main circuit board 22, and other units, e.g., a 3.5" floppy disk drive (to be referred to as an FDD hereinafter) 24, a small-capacity hard disk drive (to be referred to as an HDD hereinafter) 25, and a modem mounting unit 26 are arranged on a lower side of the board 22. Furthermore, an expansion board mounting space is ensured on the lower layer between the bottom surface of the case 1 and the main circuit board 22 by utilizing this electronic device multilayered structure.

A unit mounting region 30 and an expansion board mounting region 31 are defined in the lower case 1b on the front and rear sides with respect to a central line of the case 1 in the forward/backward direction serving as a boundary. In the unit mounting region 30, the FDD 24, the HDD 25, and the modem mounting unit 26 are sequentially mounted side by side from the left side of the lower case 1. Tall bosses 27 extend from the bottom surface of the lower case 1b at positions around these electronic devices. The main circuit board 22 is mounted in the lower case 1b while it is fastened to the upper end portions of the bosses 27 with screws.

The main circuit board 22 has a size corresponding to the size of the bottom surface of the lower case 1b. In addition, a portion, of the main circuit board 22, which corresponds to the FDD 24 is notched to improve the efficiency of device replacement. That is, the main circuit board 22 is arranged throughout the upper layer portion of the lower case 1b so as to cover the respective units, except for the FDD 24, i.e., the HDD 25, the modem mounting unit 26, and the bottom surface of the remaining portion of the lower case 1b from above.

A CPU 29, various electronic parts 32 such as semiconductor elements and resistors, and connectors 32a for connecting the respective devices to each other are mounted on the main circuit board 22 to constitute various circuits. Note that reference numeral 33 denotes connectors formed on edge portions of the main circuit board 22 to allow connection of external devices. In addition, two connectors 35 for mounting a card type electronic device such as an IC card 34 in the computer are mounted on an upper surface portion, of the main circuit board 22, located at the right side of the center.

Figure 10A:
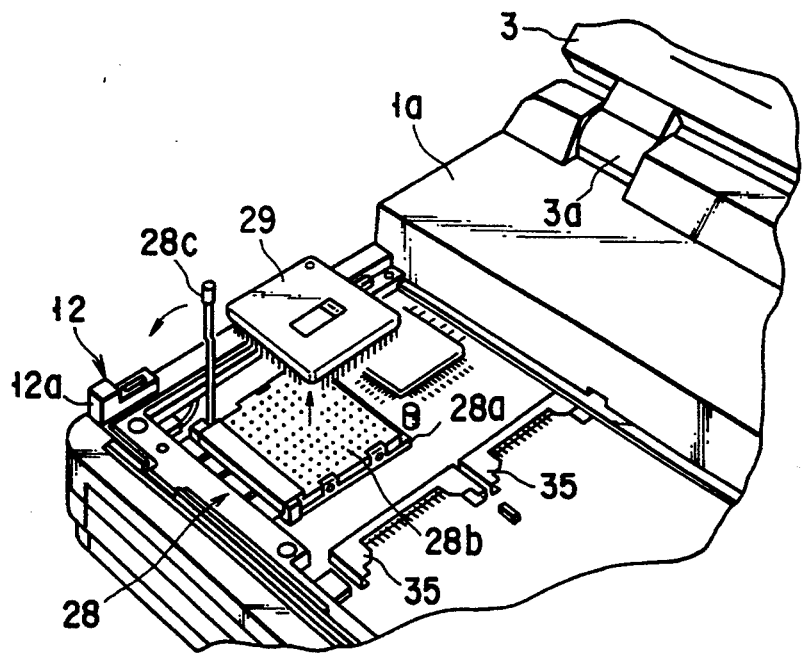
FIG. 10A is a perspective view of a part of the computer, illustrating the process of connecting a CPU to a CPU socket.
Figure 10B:
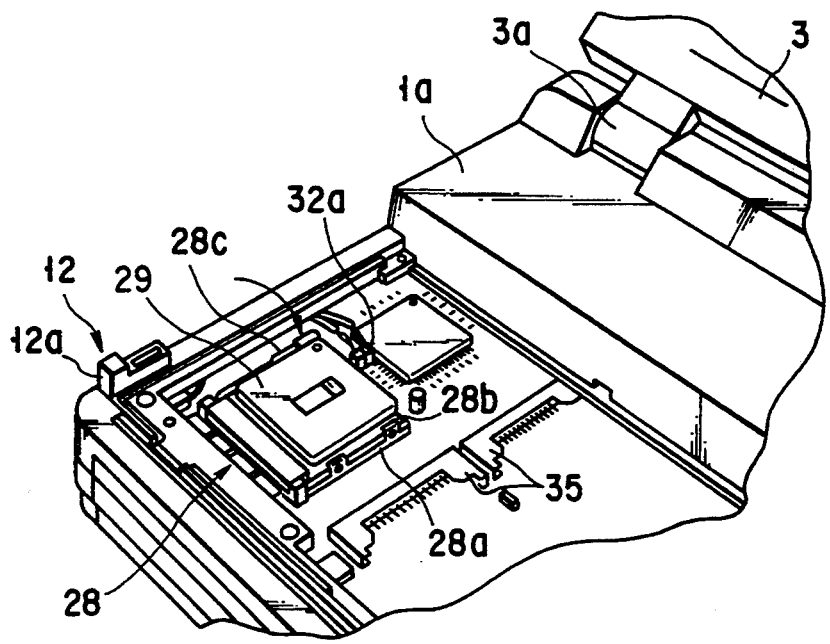
FIG. 10B is a perspective view of a part of the computer, illustrating a state wherein the CPU is connected to the CPU socket.

As shown in FIGS. 10A and 10B, the CPU 29 is detachably connected to a CPU socket 28 mounted on the main circuit board 22. As the CPU socket 28, a no. KS-11253 available from YAMAICHI ELECTRONIC CO. Ltd. is used. The socket 28 includes a base 28a fixed on the main circuit board 22, a slide table 28b mounted on the base 28a to be slidable between a lock position and a release position, and an operation lever 28b for sliding the slide table 28b. When the operation level 28c is set upright to move the slide table 28b to the release position, as shown in FIG. 10A, a large number of holes formed in the slide table 28b coincide with terminals (not shown) formed on the base 28a, thus the CPU 29 can be connect to and remove from the socket 28 when the operation lever 28c is set in a horizontal position to move the slide table 28b to the lock position together with the CPU 29 while the CPU 29 is connected to the socket 28, the positions of the holes in the slide table 28b are slightly shifted from those of the terminals on the base 28a, thereby locking the CPU 29 to the socket 28.

Figure 11:
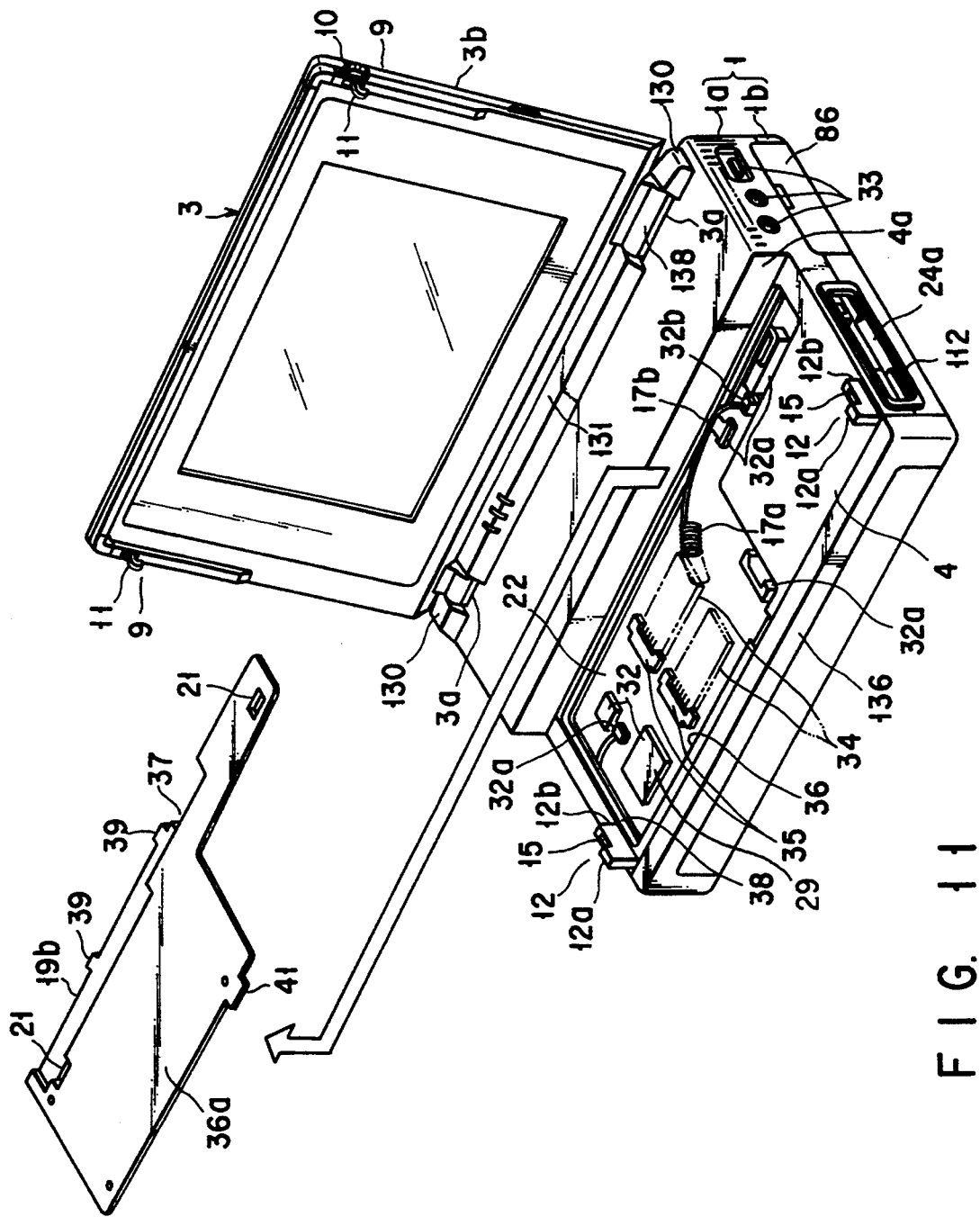
Figure 12:
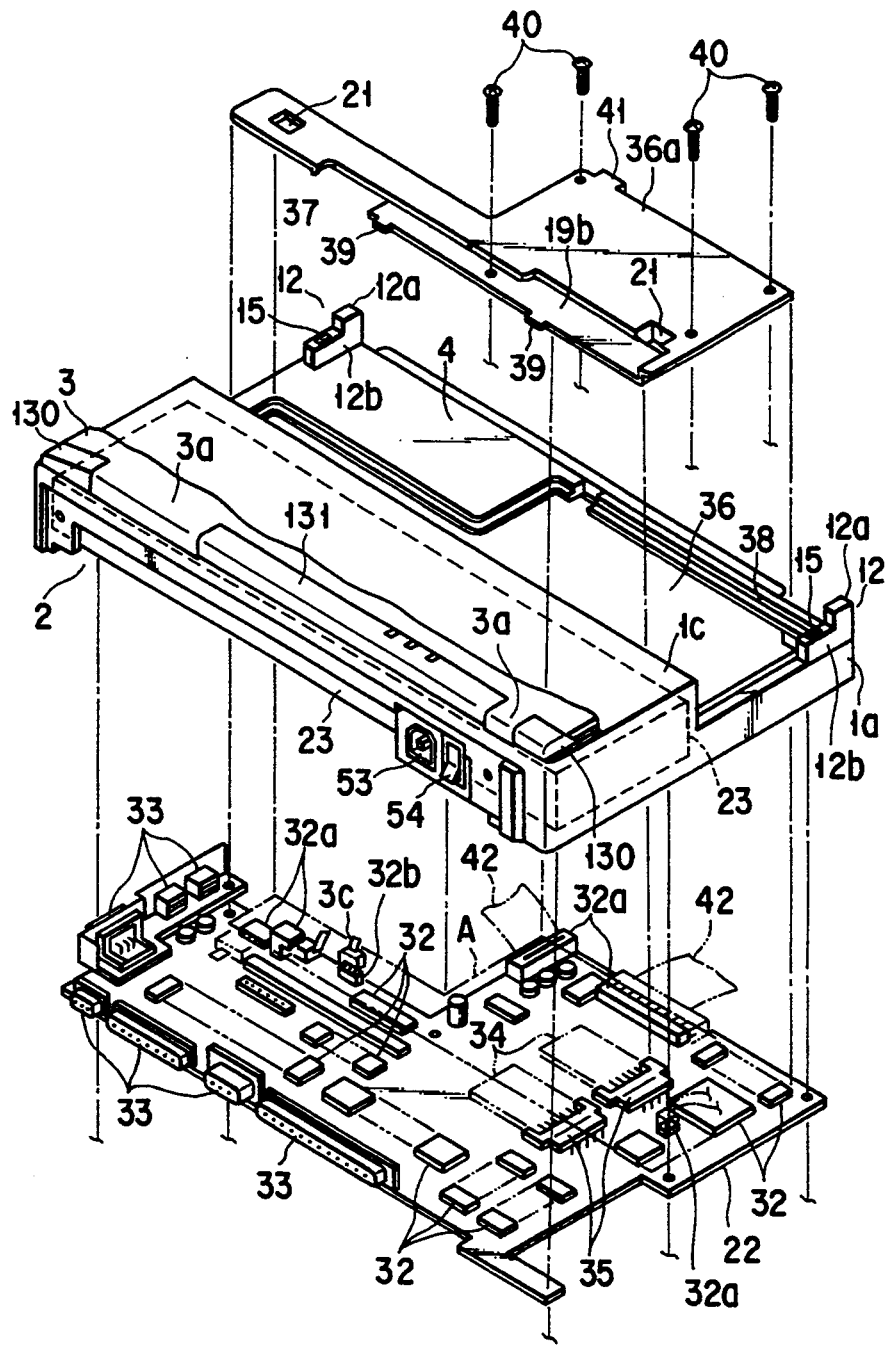

As shown in FIGS. 11 and 12, in order to allow that region A on the main circuit board 22, to which access must be externally made, such as the mounting regions for the CPU 29 and the IC card 34 or the region for connector connection, to be exposed outside, an opening 36 is formed in that portion of the upper case 1a which faces the region A. More specifically, the opening 36 corresponding to the region A is formed in the bottom surface 4b of the stepped portion 4 of the case 1. The opening 36 is normally covered with a lid 36a.

A rib 38 for supporting the lid 36a is formed along the edge of the opening 36. When the lid 36a is closed, the lid 36a and the bottom surface 4b of the stepped portion 4 become even. The lid 36a is fixed to the bottom surface 4b with screws 40 while a pair of projections 39 formed on the rear portion end of the lid 36a are fitted in fitting holes (not shown) formed in the edge of the opening 36. Note that reference numeral 41 denotes a finger hook portion extending from the front portion end of the lid 36a to allow the user to remove the lid 36a. In addition, the recess portion 19b for storing the curled cord 17 and the guide recess portions 21 for positioning the keyboard 5 are formed in the lid 36a.

When, for example, the CPU 29 and the IC card 34 are to be mounted in the case 1 or various cords are to be connected to the connectors 32a and 32b, the lid 36a is removed from the stepped portion 4 to expose the opening 36, thus exposing the region A outside, as shown in FIG. 11. With this operation, the user can perform connection while watching wires 3c extending from the display 3 to the exposed connectors 32a and 32b or wires 42 extending from the FDD 24 and the HDD 25. Similarly, the user can connect the CPU 29 and the IC card 34 to the CPU socket 28 and the connector 35 on the main circuit board 22 while watching them. Therefore, the use can reliably perform connection while checking a connecting state. Especially, the terminal pins of the connector 35 and the CPU 27 are elongated and susceptible to deformation. However, if the user performs connection while visually checking connecting and fitting states, damage to the terminal pins and the like can be prevented.

A notched portion 37 is formed in a portion of the recess portion 19a of the lid 36a. The curled cord 17 connected to the connector 32b mounted on the main circuit board 22 extends to the keyboard 5 through the notched portion 37.

Figure 13:
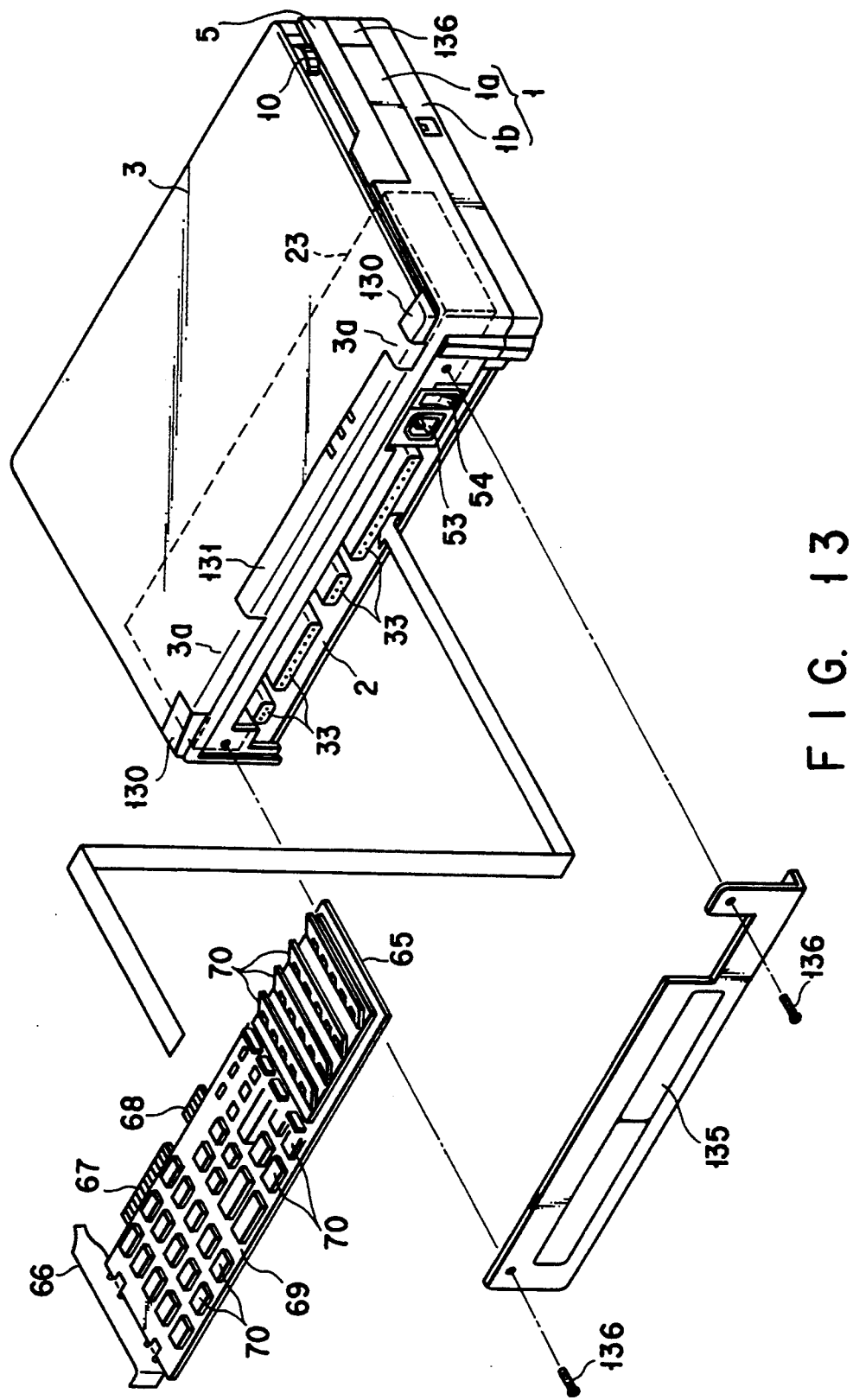

The expansion board mounting region 31 ensured below the main circuit board 22 communicates with the opening 2 in the rear portion of the case 1, as shown in FIGS. 9 and 13. When a standardized commercial expansion board 65 (e.g., an AT card) is inserted in the expansion board mounting region 31 along the bottom surface of the lower case 1b through the opening 2 in the case 1, as shown in FIGS. 13 and 14, the expansion board 65 can be mounted in the case 1 to be set abreast of the FDD 24, the HDD 25, and the modem mounting unit 26.

Figure 15:
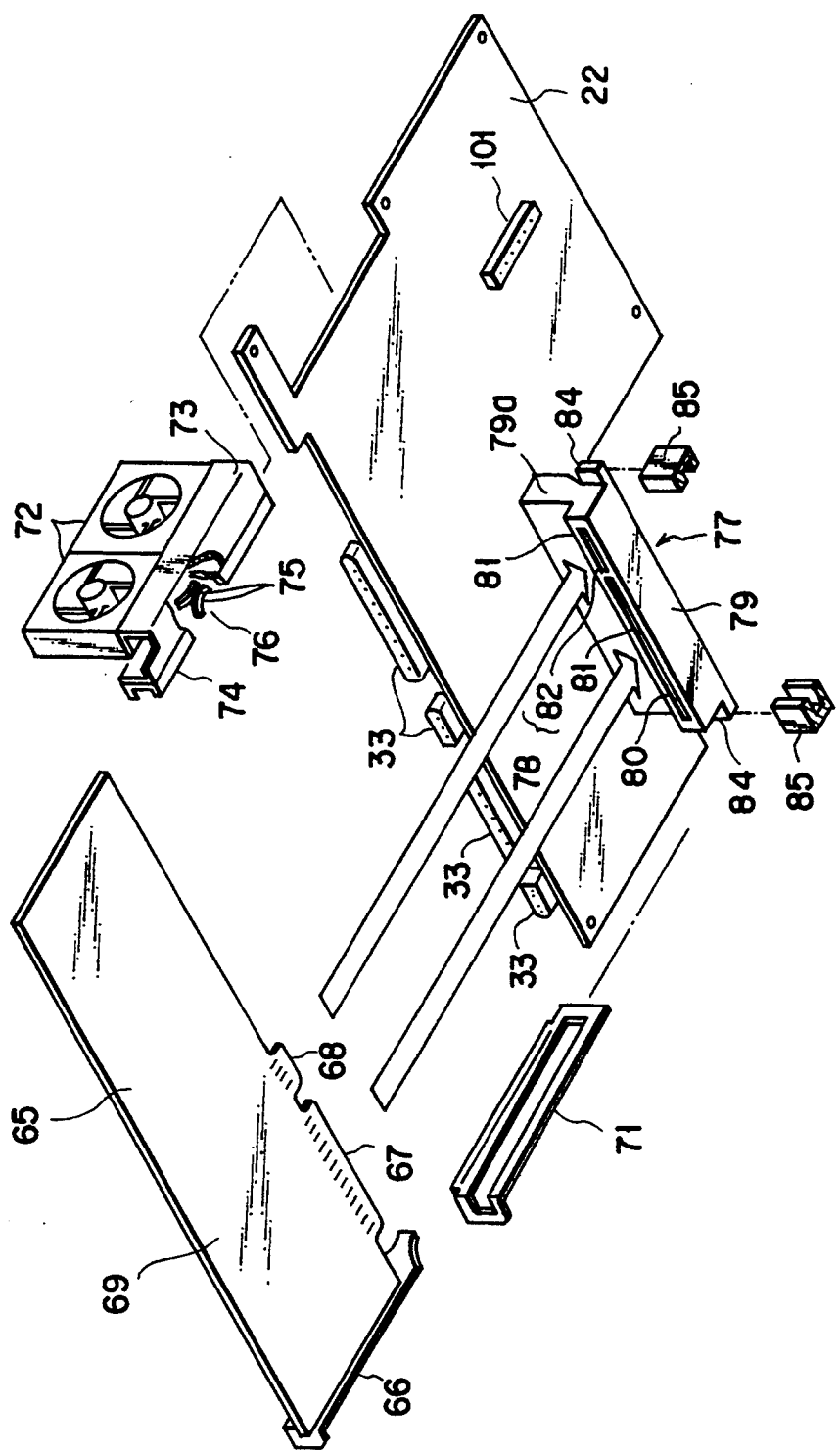

More specifically, as shown in FIGS. 9, 13, and 15, the expansion board 65 has a rectangular board 69. A guide 66 is attached to one side edge of the board 69. Contacts 67 and 68 are formed on the front edge of the board 69, with reference to the inserting direction, at two positions with respect to the side edge to which the guide 66 is attached. Various types of electronic parts 70 constituting a required extended function are mounted on the board 69.

Figure 16:
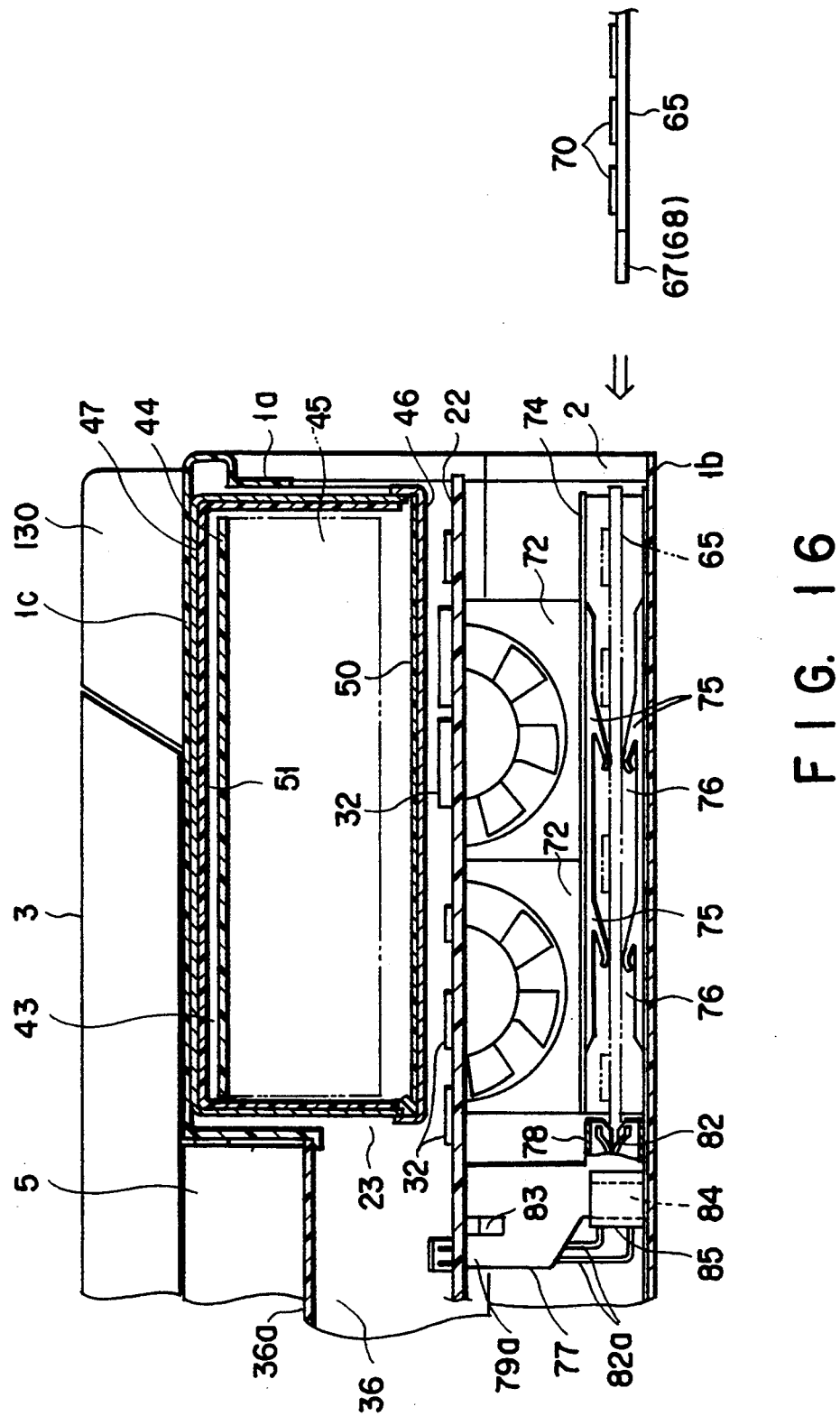

An insertion guide 71 to be engaged with the guide 66 is formed on a left end portion, of the bottom surface of the lower case 1b, which corresponds to one side of the expansion board mounting region 31 in the direction of width. Two cooling fans 72 are disposed on a right end portion, of the bottom surface of the lower case 1b, which corresponds to the other side of the expansion board mounting region 31 in the direction of width through a frame 73. As shown in FIGS. 15 and 16, the frame 73 has a clamp type insertion guide 76 which is constituted by a pair of wedge-like elastic pieces 75 disposed between rail-like members 74. The expansion board 65 is inserted into the expansion board mounting region 31 through these insertion guides 71 and 76. The opening 2 formed in the rear portion of the case 1 is normally covered with a rear cover 135 fastened to the case 1 with screws 136.

Figure 17:
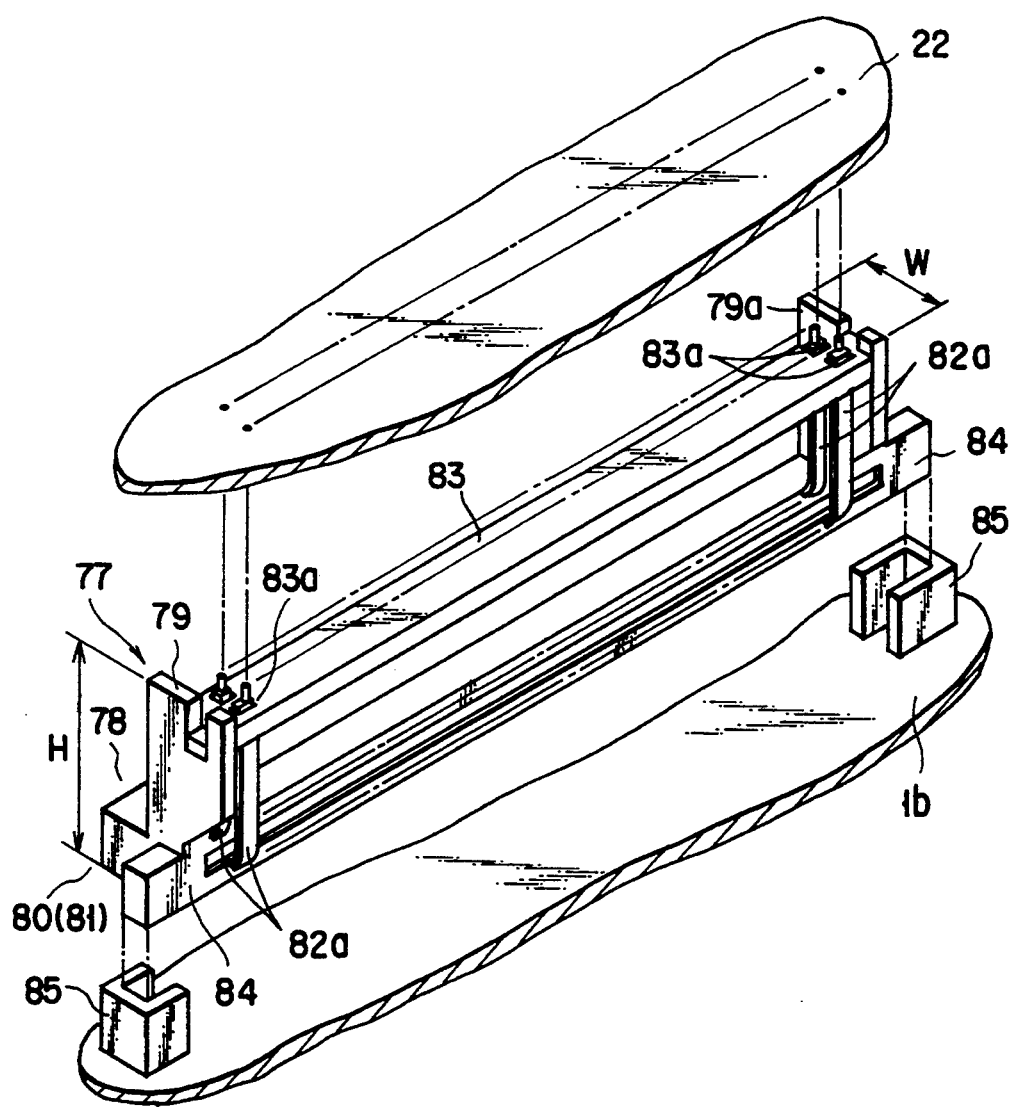

An L-shaped, compact connector 77 is suspended from the lower surface of the main circuit board 22 at a position opposite the expansion board mounting region 31, as shown in FIGS. 15 to 17. This connector 77 includes a connecting portion 78 in which the contacts 67 and 68 of the expansion board 65 inserted in the expansion board mounting region 31 in a predetermined manner are fitted. The expansion board 65 inserted in the expansion board mounting region 31 is electrically connected to the main circuit board 22 through the contacts 67 and 68 and the connector 77. With this operation, the expansion board 65 can be mounted in the case 1 by effectively utilizing the space in the rear portion side of the case 1.

Note that an opening (not shown) for exposing the connecting portion 78, which is covered with a lid 86 (see FIG. 2), is formed in a side wall, of the lower case 1b, which opposes the insertion guide 71. With this structure, if an expansion board mounted in the expansion board mounting region 31 has a connecting mouthpiece (not shown) formed on the guide 66 to connect an external device, the connecting mouthpiece can be exposed outside the case 1 by removing the lid 86.

Since a height H of the connector 77 (i.e., the size by which the connector 77 extends from the main circuit board 22) is large, when the expansion board 65 is connected/disconnected to/from the connector 77, a large stress acts on the connector 77. For this reason, the connector 77 in this embodiment has a structure which can resist such a stress.

More specifically, the connector 77 has a connector main body 79 consisting of an L-shaped block, and extends in the direction of the width of the case 1. An end portion, of the connector main body 79, which is spaced apart from the main circuit board 22, i.e., a lower end portion of the connector main body 79, is formed to be wider than the remaining portion. As shown in FIGS. 15 to 17, elongated connecting ports 80 and 81 are formed in the rear end face of the lower end portion of the connector main body 79, which opposes the expansion board mounting region 31. A large number of contacts 82 are arranged in the connecting ports 80 and 81 along the longitudinal direction of the connector main body 79, thus constituting the connecting portion 78. An L-shaped conductive piece 82a connected to each contact 82 extends through an alignment guide 83 formed on the upper end of the connector main body 79. The distal end of the conductive piece 82a is placed at a predetermined position without a shift by the alignment guide 83. Note that the alignment guide 83 has a large number of openings 83a formed in accordance with the arrangement of the conductive pieces 82a, and serves to align the end portions of the conductive pieces 82a at the respective predetermined positions by allowing them to extend through the openings 83a. The distal end portions of the conductive pieces 82a are soldered to the main circuit board 22. As a result, the overall connector 77 is suspended from the main circuit board 22.

A direction W of the width of the upper end face, of the connector main body 79, which is fixed to the main circuit board 22 coincides with the inserting/ removing direction of the expansion board 65, thus improving the stability of the connector 77 in connection of the expansion board 65.

The height H of the connector main body 79 almost coincides with the distance between the main circuit board 22 and the bottom surface of the lower case 1b. In addition, a pair of projections 84 extend from the two sides of the lower end portion of the connector main body 79. The lower end face of the connector main body 79 is in contact with the bottom surface of the lower case 1b, while the projection 84 are fitted in a pair of engaging frames 85 extending from the bottom surface of the lower case 1b. With this structure, when the expansion board 65 is inserted/removed in/from the connector 77, displacement of the connector 77, especially displacement of the lower end portion of the connector 77 can be restricted. Therefore, even if a large force acts on the connector 77 when the expansion board 65 is connected/removed to/from the connector 77, no moment acts on the connector 77 with its upper end portion serving as a fulcrum, thereby preventing damage, disconnection, and the like from occurring in the connector 77. In addition, the connector 77 also serves as a support for the main circuit board 22 and hence can prevent distortion of the main circuit board 22.

The power supply unit 23 is arranged above the main circuit board 22. More specifically, as shown in FIGS. 12, 16, 18, and 19, the power supply unit 23 is stored in a rear portion, of the upper case 1a, which has a large thickness, and extends throughout the direction of the width of the case 1. The power supply unit 23 is fixed to the inner surface of the upper case 1a and is suspended therefrom. The power supply unit 23 has the following structure in order to achieve a reduction in weight.

The structure of the power supply unit 23 and the structure for mounting the power supply unit 23 are shown in FIGS. 16 and FIGS. 18 to 21. Note that FIGS. 18 and 19 each show a structure viewed from behind the reversed upper case 1a.

The power supply unit 23 has a power supply circuit portion 43. The power supply circuit portion 43 is constituted by a circuit board 44 on which various types of electronic devices 45 constituting a power supply circuit are mounted. In addition, the power supply unit 23 includes an upper cover 46 constituted by a belt-like metal plate, and a lower cover 47 constituted by an elongated box-like metal plate. Large and small openings 48 are formed in both the upper and lower covers 46 and 47 to minimize their weights.

A plate-like insulating sheet 50 consisting of a resin such as vinyl chloride is stacked on the inner surface of the upper cover 46, and a metal layer, e.g., an aluminum sheet 49 (indicated by the alternate long and two short dash line in FIG. 20) is stacked on a surface, of the insulating sheet 50, located on the upper cover 46 side. An elongated box-like insulating sheet 52 (e.g., a vinyl chloride sheet) having a metal layer, e.g., an aluminum sheet 51 (indicated by the alternate long and two short dash line in FIG. 21), stacked on its outer surface is stacked on the inner surface of the lower cover 47 in conformity with its shape. The upper and lower covers 46 and 47 are assembled around the power supply circuit portion 43 to clamp the power supply circuit portion 43 in the vertical direction, thus constituting the power supply unit 23. Although not shown, in assembly, the upper and lower covers 46 and 47 are engaged with each other with pawls and fastened to each other with screws.

The power supply unit 23 having the above-described arrangement is designed such that the insulating sheets 50 and 52 and the metal sheets 49 and 51, which are much lighter than the upper and lower metal covers 46 and 47, compensate for a deterioration in shielding characteristics due to the formation of the openings 48. Therefore, a great reduction in the weight of the power supply unit 23 can be achieved as compared with an electromagnetic shielding structure constituted by only the upper and lower covers 46 and 47.

Note that a power supply connecting port 53 and a power switch 54 are formed on the side wall of the lower cover 47. In addition, various wires 55 extend from the circuit board 44, and connectors 56 connected to the main circuit board 22 are attached to the distal ends of the wires 55.

Figure 18:
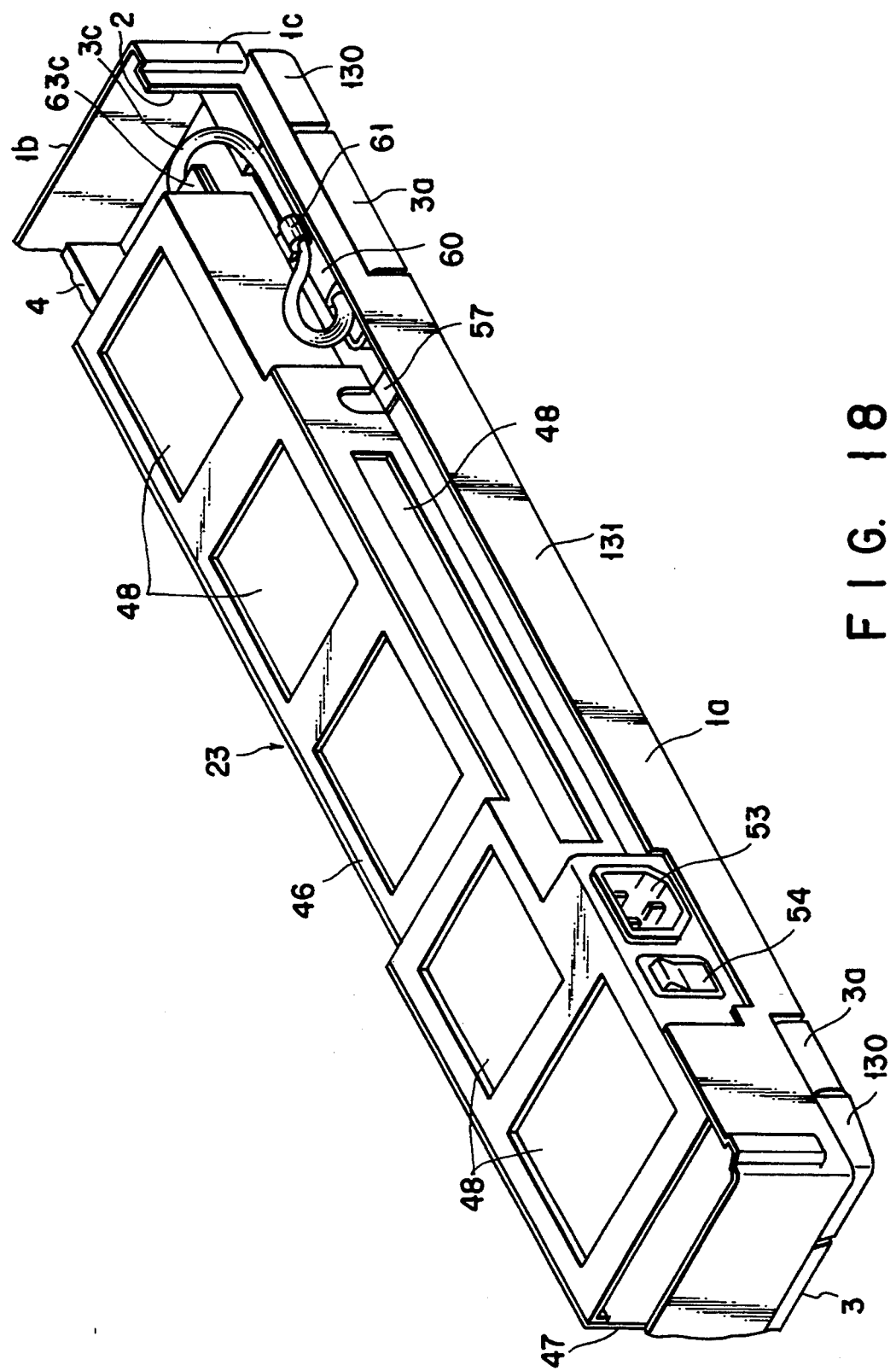
Figure 19:
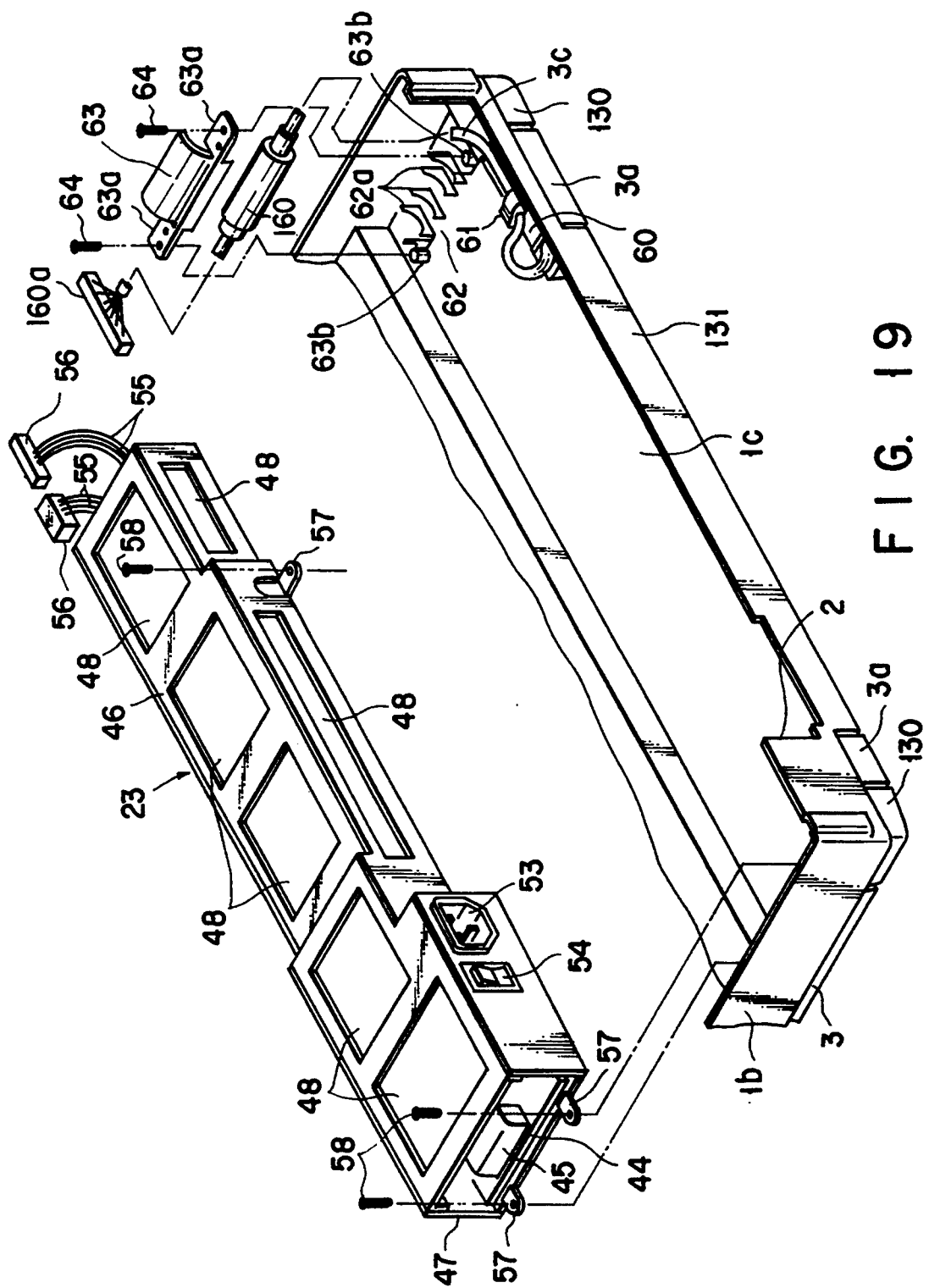
Figure 20:
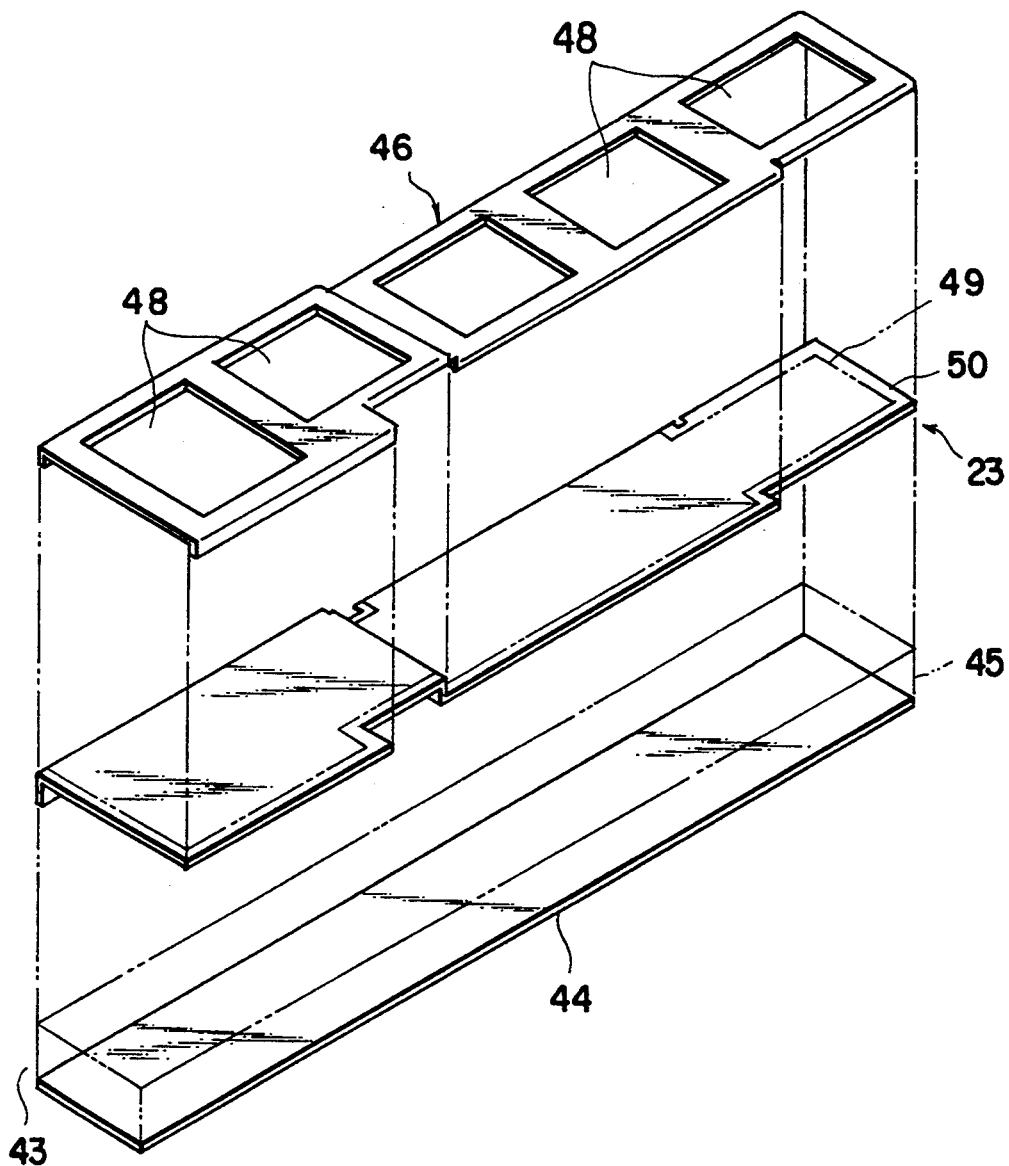
Figure 21:
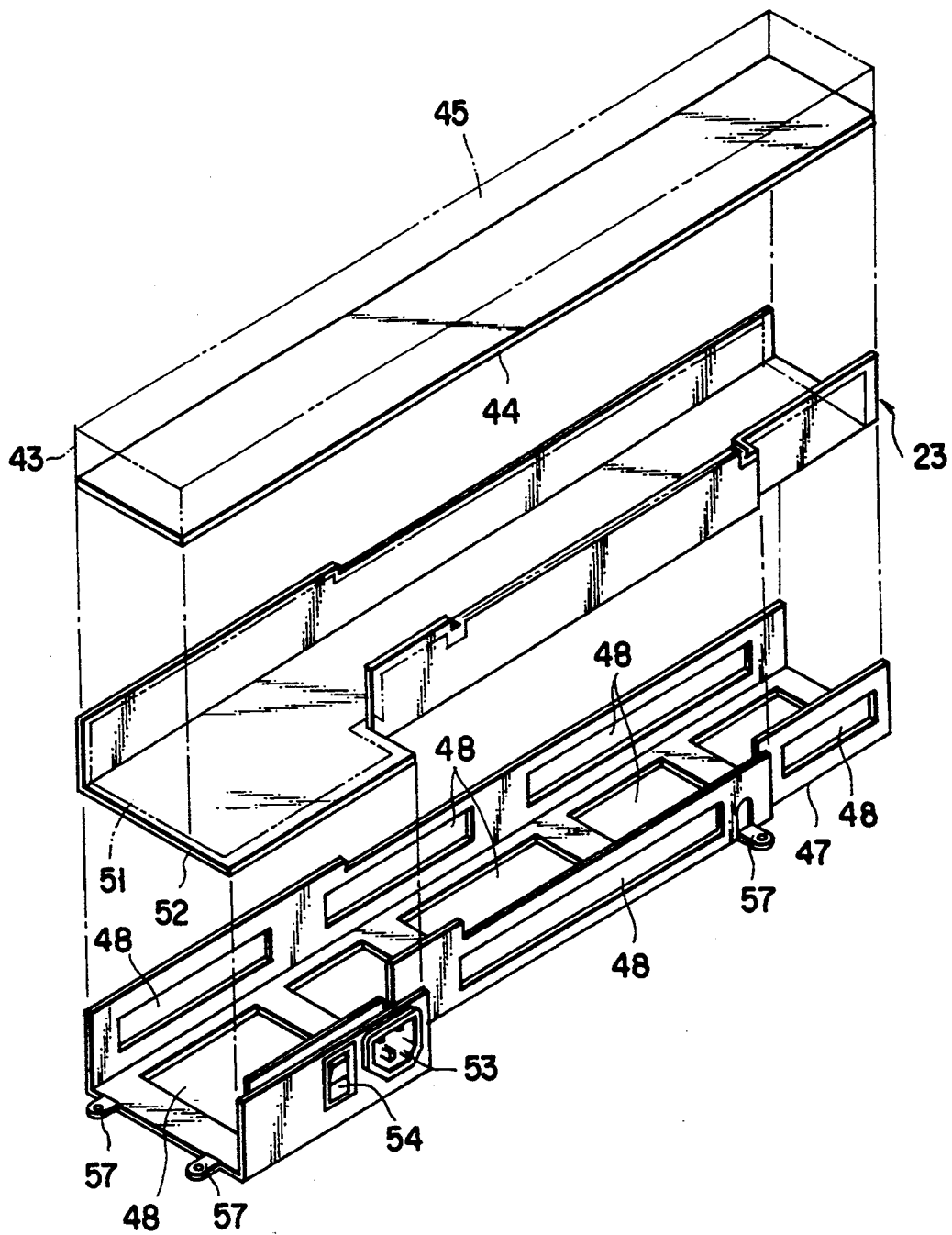

As shown in FIGS. 18 and 19, the power supply unit 23 is mounted in a rear portion 1c of the upper case 1a. More specifically, brackets 57 extend from the lower cover 47, and a plurality of bosses (not shown) for receiving the brackets 57 are formed on the inner surface of the upper case 1a. Screws 58 are screwed into the bosses, so that the overall power supply unit 23 is suspended in the rear portion 1c. When the power supply unit 23 is fastened to the inner surface of the upper case 1a with screws, the power supply unit 23 whose rigidity is reduced because of the formation of the openings 48 is covered with the wall of the upper case 1a having high rigidity, i.e., the rear portion 1c, thereby compensating for the reduction in rigidity of the power supply unit 23. Therefore, a reduction in the weight of the power supply unit 23 and the computer itself can be achieved while sufficient rigidity is ensured.

The power supply unit 23 and the upper case 1a are designed to prevent the wire 3c extending from the display 3 from becoming a hindrance when the power supply unit 23 is fixed to the upper case 1a. More specifically, as shown in FIGS. 18 and 19, a harness wire guide 61 constituted by a substantially L-shaped plate is formed on a portion, of the inner surface of the upper case 1a, located outside the region in which the power supply unit 23 is mounted, e.g., the inner surface of a cover portion 60 of a hinge 59. An intermediate portion of the wire 3c is hooked on the harness wire guide 61 in advance to withdraw the wire 3c from the region in which the power supply unit 23 is mounted, thereby preventing the wire 3c from being caught between the power supply unit 23 and the rear portion 1c upon mounting of the power supply unit 23.

Figure 22:
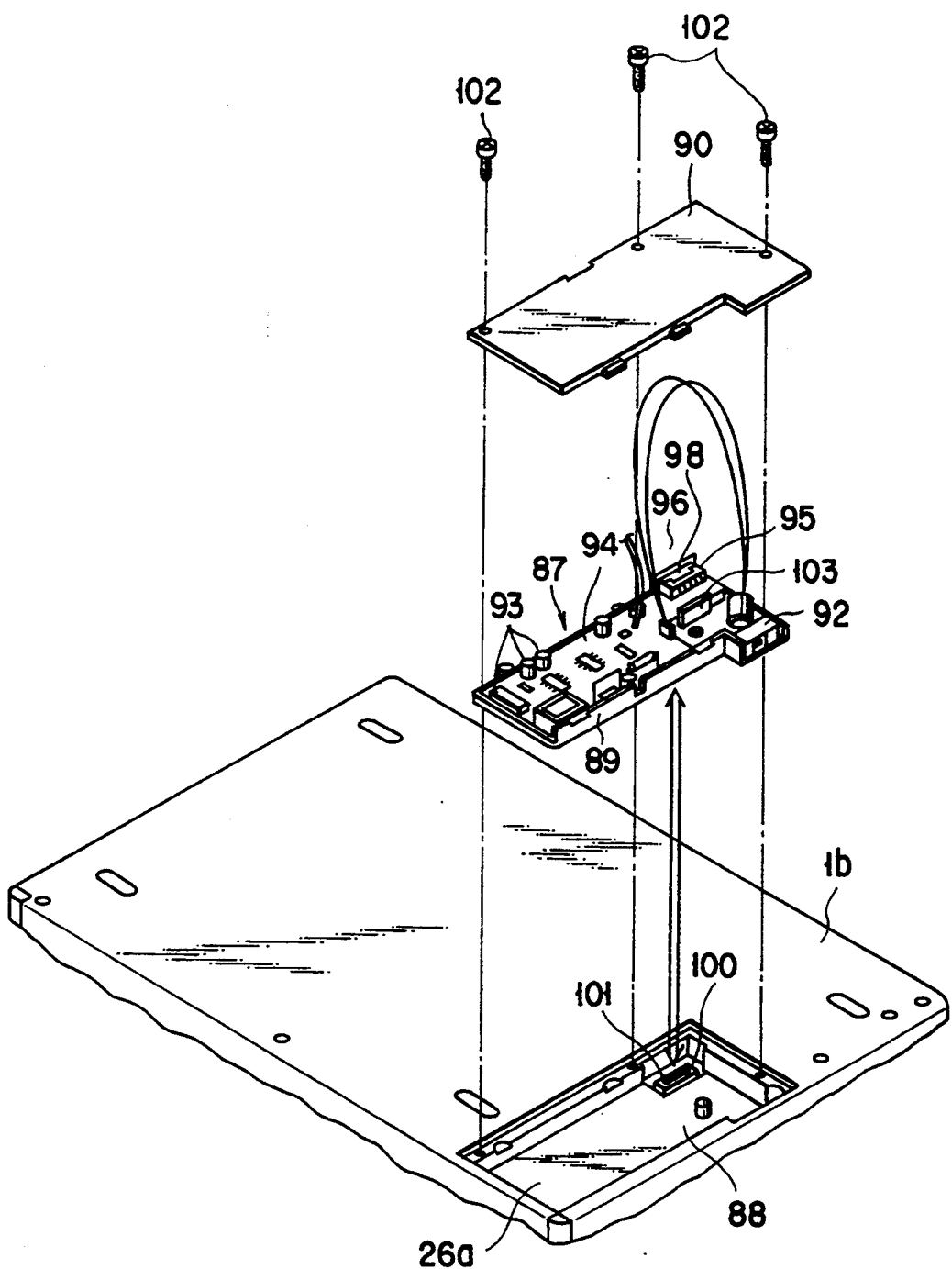

In addition to this structure, as shown in FIG. 22, a core receptacle 62 for receiving a ferrite core portion 160 arranged midway along the wire 3c is formed on a portion, of the inner surface of the rear portion 1c, which is adjacent to the region in which the power supply unit 23 is mounted. The core receptacle 62 is constituted by a plurality of semicircular plate portions 62a arranged side by side. The ferrite core portion 160 is restrained by the core receptacle 62. More specifically, the ferrite core portion 160 positioned by the core receptacle 62 is covered with an arcuated belt-like holding cover 63, and the cover 63 is fixed to the inner surface of the upper case 1a with screws 64. With this structure, the ferrite core portion 160 is restrained to a predetermined position so as not to be accidentally shifted. Referring to FIG. 19, reference numeral 63a denotes mounting brackets of the holding cover 63; 63b, bosses formed on the rear portion 1c and designed to allow the brackets 63a to be mounted thereon; and 160a, a connector connected to an end portion of the wire 3c.

As described above, since the case 1 employs the multilayered structure, in which the power supply unit 23 is mounted on the upper layer, and the FDD 24, the HDD 25, and the modem mounting unit 26 are mounted on the lower layer, with the main circuit board 22 serving as a boundary layer, the respective constituent members can be mounted in the case 1 at a high density. In addition, since the expansion board 65 can be arranged below the main circuit board 22, a reduction in size and weight of the computer main body can be achieved. Furthermore, as shown in FIG. 16, the fans 72 are arranged to oppose the space between the power supply unit 23 and the main circuit board 22 of the above-described multilayered structure, and the spaces between the main circuit board 22, the expansion board 65, and the respective driving units. With this arrangement, the fans 72 can efficiently draw air in these spaces and hence can effectively cool the interior of the case 1.

Figure 23:
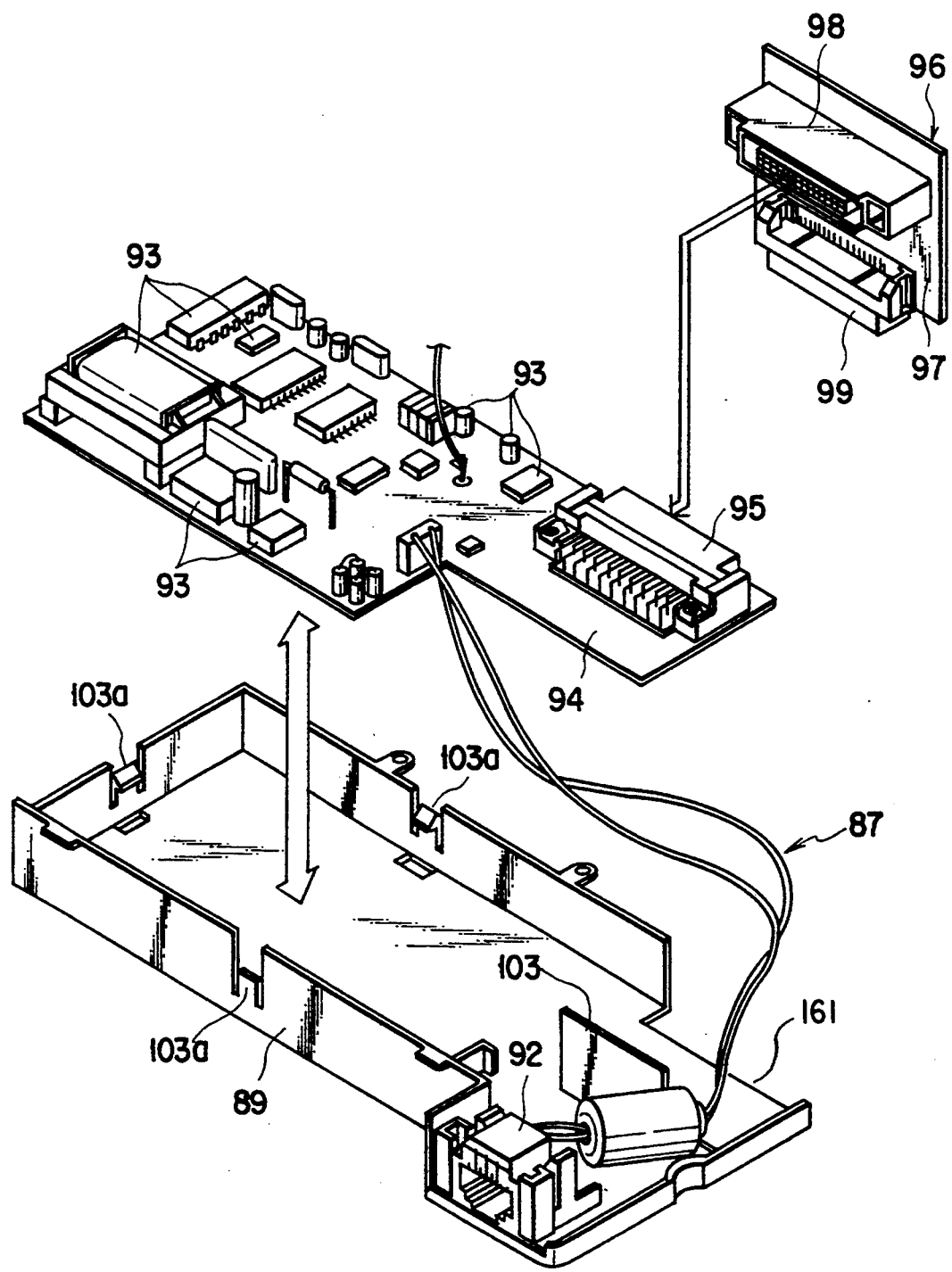

According to this embodiment, a structure having high assembly performance with respect to a modem 87 is employed for the modem mounting unit 26. More specifically, as shown in FIGS. 9, 22, and 23, the unit 26 has a rectangular cover 26a, which is fixed to the bottom surface of the lower case 1b from the inside of the lower case 1b so as to cover the opening formed in the bottom surface. A flat, rectangular recess portion 88 capable of storing the modem 87 is defined by the cover 26a. The recess portion 88 is normally covered with a lid 90 fastened to the lower case 1b with screws 102.

The modem 87 is commercially available as an optional part and comprises a modem housing 89 and a circuit board 94. A terminal 92 to which a telephone line is connected is fixed to the modem housing 89. Electronic parts 93 constituting various circuits for converting a digital signal into an analog signal are mounted on the circuit board 94. A connector 95 for connecting the modem 87 to the computer main body is mounted on a predetermined portion of the circuit board 94, e.g., a narrow portion. This connector 95 is normally arranged in a lateral position such that the connecting direction is parallel to the circuit board 94.

The modem mounting unit 26 includes a relay board 96. The relay board 96 has a rectangular board 97 and first and second connectors 98 and 99 fixed to the board 97. The first connector 98 is fixed to one end portion of the surface of the board 97 such that the connecting direction coincides with a direction perpendicular to the board 97 and the first connector 98 can be connected to the terminal 92 of the modem 87. The second connector 99 is fixed to the other end portion of the surface of the board 97 such that the connecting direction is parallel to the surface of the board 97. The first and second connectors 98 and 99 are electrically connected to each other through a conductive path (not shown) formed on the surface of the board 97.

When the first connector 98 of the relay board 96 is connected to the connector 95 of the modem 87, the relay board 96 extends downward from the circuit board 94 in substantially the vertical direction. A notched portion 161 is formed in the modem housing 89 to allow the relay board 96 to extend therethrough. In addition, an opening 100 is formed in a portion, of the cover 26a, which opposes the second connector 99 when the modem 87 is mounted in the recess portion 88. A connector 101 (see FIG. 15) which can be connected to the second connector 99 to allow connection of the modem 87 is fixed to the lower surface of the main circuit board 22. The connecting portion of the connector 101 opposes the opening 100.

When the modem 87 is to be incorporated in the computer main body, the first connector 98 is connected to the connector 95, and the relay board 96 is assembled after the modem 87 is mounted in the modem housing 89 in a predetermined manner, as shown in FIG. 23. Subsequently, as shown in FIG. 22, while the modem housing 89 is stored in the recess portion 88 of the case 1b together with the modem 87 and the relay board 96, the second connector 99 of the relay board 96 is connected to the connector 101 through the opening 100. With this process, the modem 87 can be easily connected to the main circuit board 22. Thereafter, the lid 90 is placed on the opening portion of the recess portion 88 to cover the modem 87 stored therein, and the lid 90 is fixed to the lower case 1b with the screws 102, thereby reliably mounting the modem 87 in the computer main body.

Referring to FIG. 23, reference numeral 103 denotes a knob extending from the inner surface of the modem housing 89 to allow the user to hold with his/her fingers and designed to be used to remove the modem 87 from the recess portion 88 together with the modem housing 89 and the relay board 96; and 103a, pawls detachably engaged with edge portions of the board 97 mounted in the modem housing 89 to fix the modem 87 in the modem housing 89.

An upper end portion of the board 97 of the relay board 96 protrudes upward from the first connector 98 to allow the user to hold with his/her fingers when the modem 87 is to be removed from the recess portion 88. When the user holds the upper portion of the board 96 and removes the second connector 99 from the connector 101, the modem 87 can be reliably and easily removed from the recess portion 88. In addition, the upper end of the board 96 is brought into contact with the inner surface of the lid 90 when the modem 87 is mounted in the recess portion 88 and is covered with the lid 90. With this structure, the movement of the relay board 96 in the direction in which the second connector 99 is removed from the connector 101 of the main circuit board 22 is restrained by the lid 90. As a result, the connected state of the modem 87 can be reliably maintained.

In the computer of the embodiment, a compact disk drive (CDD) 104 using a compact disk (CD), set as an optional part, as a ROM, and a high-capacity HDD 105 can be mounted in place of the FDD 24 incorporated in the case 1.

Figure 24:
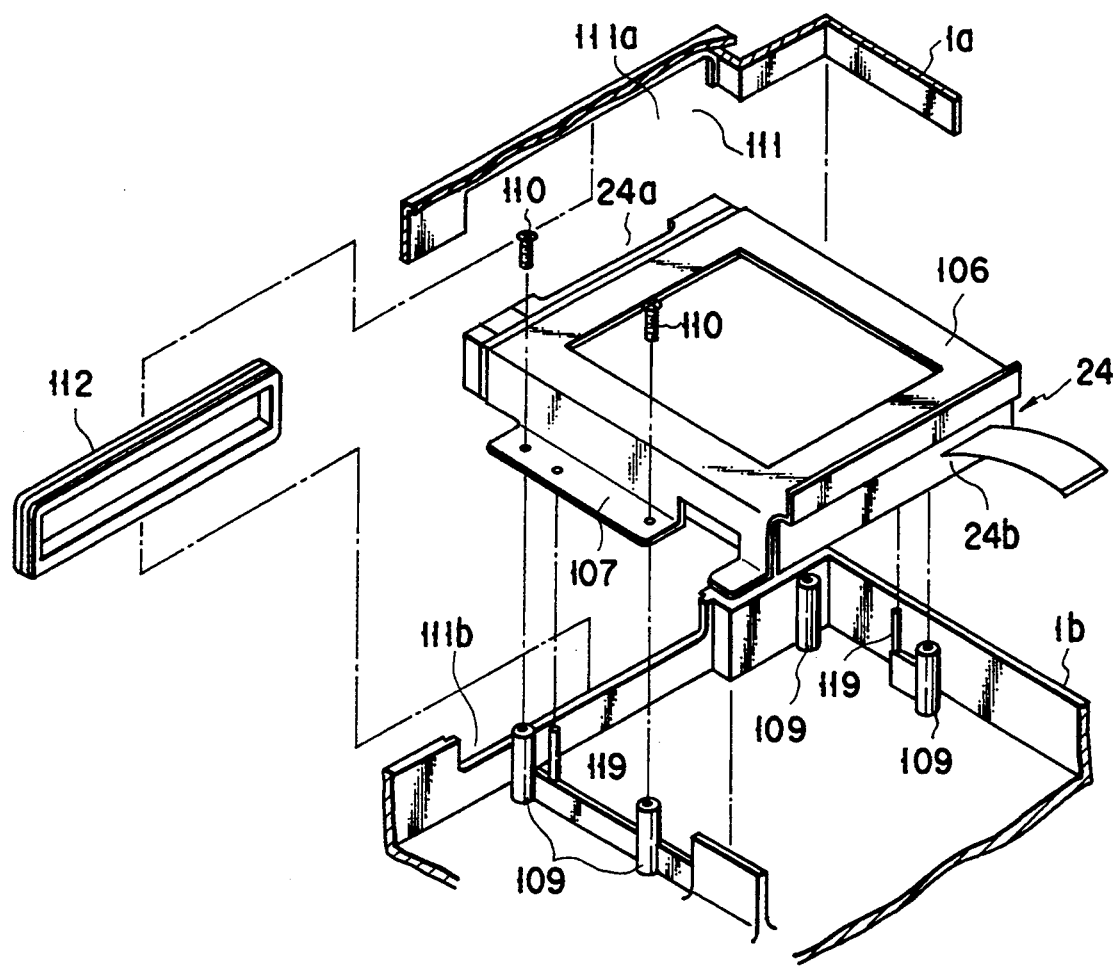

More specifically, as shown in FIGS. 9 and 24, the FDD 24 incorporated in the case 1 has a main body 24b, and a plate-like frame 106 is fixed to the FDD 24 to cover the main body 24b from above. Extended pieces 107 laterally extend from the two sides of the frame 106. Bosses 109 are formed on the bottom surface of the lower case 1b in correspondence with a plurality of small holes 108 formed in the extended pieces 107 (only one is shown). After the extended pieces 107 are placed on the bosses 109 in a predetermined manner, screws 110 are screwed into the bosses 109 through the small holes 108. With this operation, the FDD 24 is fixed to the bottom surface of the lower case 1b. A floppy disk insertion port 24a in the FDD 24 opposes an exposure opening 111 (a combination of elongated openings 111a and 111b formed in the peripheral walls of the upper and lower cases 1a and 1b) formed in the peripheral wall of the case 1. In addition to the bosses 109, positioning pins 119 are formed on the bottom surface of the lower case 1b. When these pins 119 are engaged with the extended pieces 107 of the frame 106, the FDD 24 is positioned.

Figure 27A:
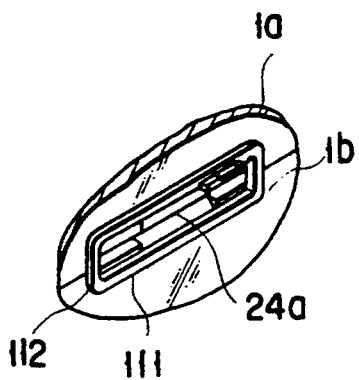
FIG. 27A is a schematic view showing an FD insertion portion for the FDD.

When the FDD 24 is incorporated in the case 1, a face frame 112 is attached to the exposure opening 111 in the case 1 to match the shape of the opening 111 with the outer shape of the FD insertion port 24a of the FDD 24, as shown in FIGS. 24 and 27A.

Figure 25:
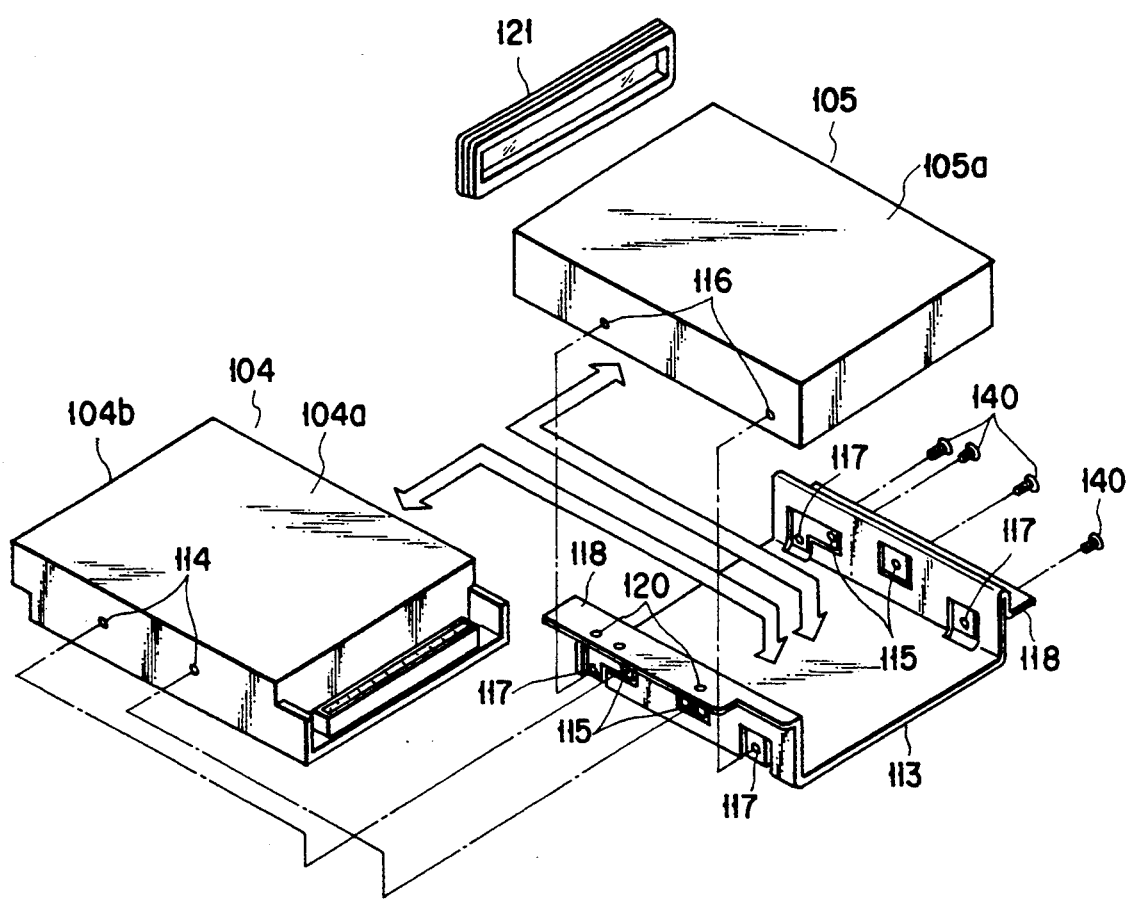
Figure 26:
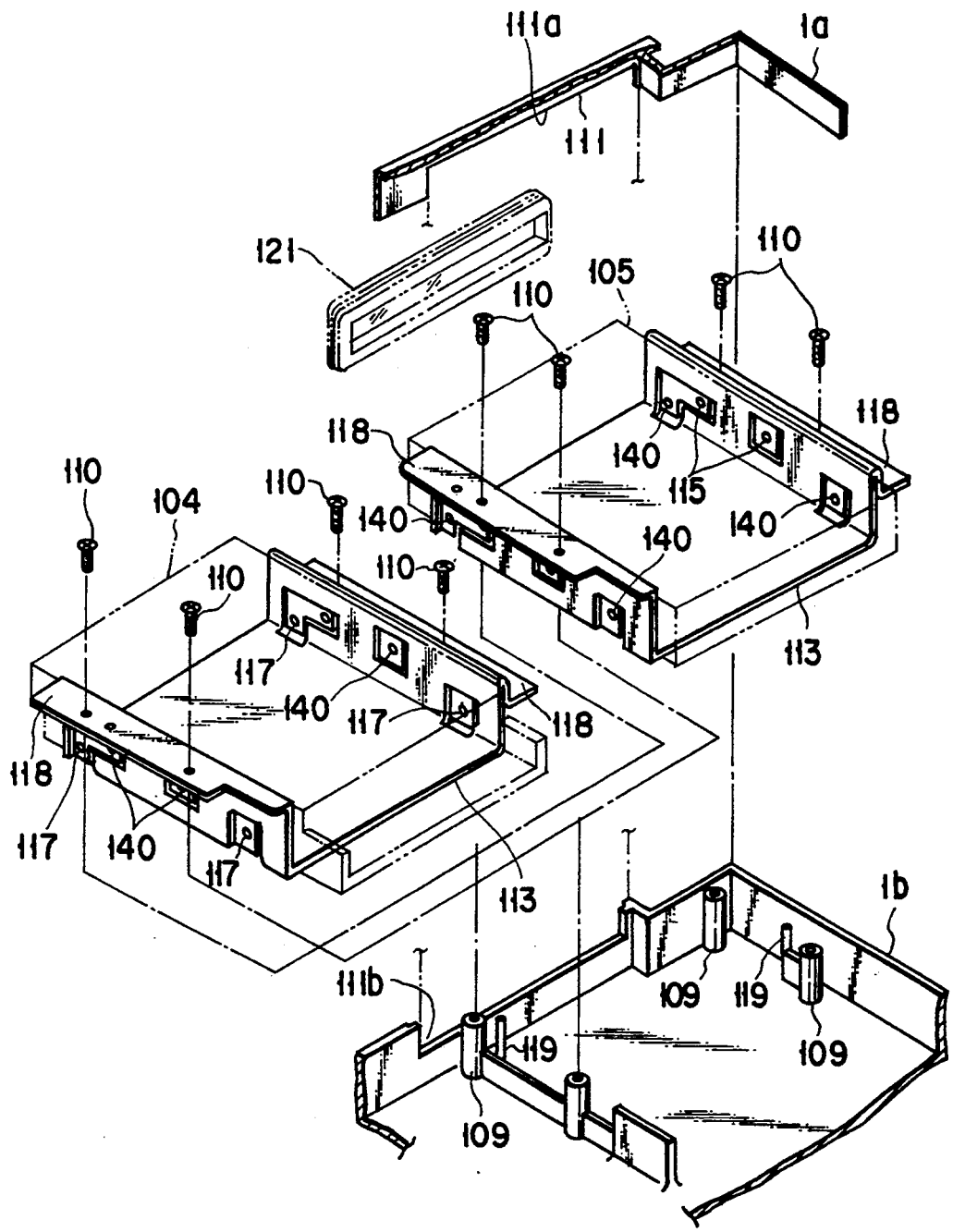

When the CDD 104 and the HDD 105 are to be fixed in the lower case 1b in place of the FDD 24, the CDD 104 and the HDD 105 are fixed to the bosses 109 by using a common frame 113 after the FDD 24 is removed, as shown in FIGS. 25 and 26.

More specifically, commercially available 8" CDD 104 and 3.5" HDD 105 have almost the same outer size and are larger in outer size than the FDD 24. The frame 113 is constituted by a plate member bent into a substantially U shape so as to cover main bodies 104a and 105a of the CDD 104 and the HDD 105 from below. Through holes 115 are formed in the two side walls of the frame 113 at positions corresponding to fixing screw holes 114 formed in the main body 104a of the CDD 104, and through holes 117 are also formed in the two side walls at positions corresponding to fixing screw holes 116 formed in the main body 105a of the HDD 105. With this structure, either the CDD 104 or the HDD 105 can be selectively fixed to the frame 113 with screws 140.

Extended pieces 118 laterally extend from both the sides of the frame 113. Small holes 120 are formed in the respective extended pieces 118 in correspondence with the positions of the bosses 109 and the pins 119 of the lower case 1b.

When, therefore, the CDD 104 is to be incorporated in the case 1 instead of the FDD 24, the main body 104a of the CDD 104 is fitted in the frame 113 and is fastened thereto with screws, as shown in FIG. 25. Thereafter, as shown in FIG. 26, the extended pieces 118 of the frame 113 are fastened to the bosses 109, from which the FDD 24 is removed, with screws. When the HDD 105 is to be incorporated, the main body 105a of the HDD 105 is fitted in the frame 113, and the extended pieces 118 of the frame 113 are fastened to the bosses 109, from which the FDD 24 is removed, with screws, as shown in FIG. 26.

Figure 27B:
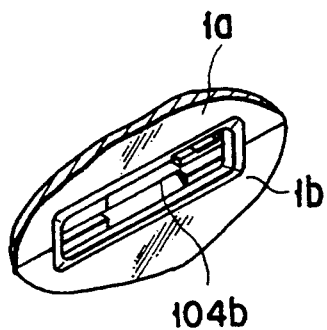
FIG. 27B is a schematic view showing a CD insertion portion for the CDD.
Figure 27C:
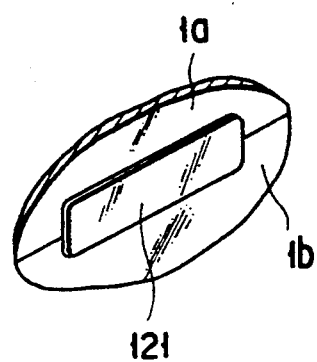
FIG. 27C is a schematic view showing an exposure opening when the HDD is mounted.

Note that a CD insertion port 104b of the CDD 104 is slightly larger in outer size than the FD insertion port 24a of the FDD 24. For this reason, when the CDD 104 is mounted in the case 1, the face frame 112 is removed from the exposure opening 111 to directly expose the CD insertion port 104b through the exposure opening 111, as shown in FIG. 27B. Since the HDD 105 has no portion allowing a disk (not shown) to be inserted therein, unlike the FDD 24 and the CDD 104, when the HDD is mounted in the case 1, a blind lid 121 is attached to the exposure opening 111 instead of the face plate 112 so that the main body 105a of the HDD 105 cannot be seen from the outside, as shown in FIG. 28.

According to the above-described arrangement, various types of storage devices such as an FDD, a CDD, and an HDD can be selectively incorporated in the case 1, and recording media such as an FD and a CD can be loaded/unloaded through the common exposure opening 111. In addition, when no recording medium need be loaded/ unloaded as in the case of an HDD, the exposure opening 111 is covered with the blind lid 121 to prevent entrance of dust into the case 1 through the opening 111 and a deterioration in appearance of the case 1.

Figure 28:
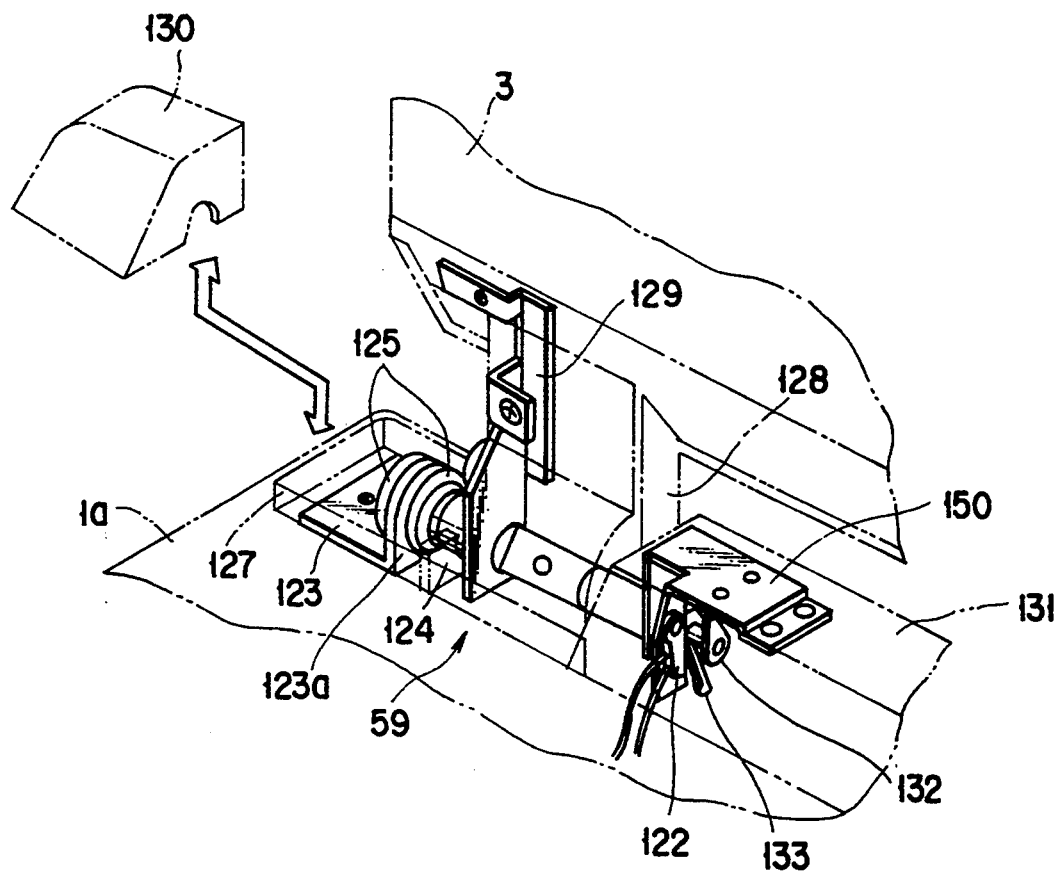

As shown in FIGS. 1 and 28, the display 3 is pivotally fixed to the case 1 through the hinges 59 disposed in the leg portions 3a. For example, near the left hinge 59, an opening/closing switch 122 is arranged. The switch 122 serves to turn off the power supply to the display 3 when the display 3 is closed (when the display 3 is not used), and to turn on the power supply when the display 3 is set upright.

More specifically, the hinge 59 includes an L-shaped base plate 123 fixed to the upper case 1a, and a shaft 124 extending through a through hole formed in a vertical wall 123a of the base plate 123. A pair of flange portions 125 are formed on the shaft 124 to clamp the vertical wall 123a from both sides, and compressed disk springs (not shown) are inserted between the flange portions 125 and the vertical wall 123a. A horizontal wall of the base plate 123 is fixed to a fixing base 127 constituted by a recess portion formed in a rearmost portion of the upper surface of the upper case 1a to extend in the direction of width. The shaft 124 is cantilevered by the base plate 123 and extends therefrom into the case 1 in an almost horizontal direction. The shafts 124 of the pair of hinges 59 are coupled to a main body 128 of the display 3 through brackets 129 to support the display 3 so as to allow the display 3 to be freely opened/closed. Hinge covers 130 cover the fixing bases 127 and the base plates 123, and leg covers 138 of the display 3 cover the brackets 129.

Since the devices are mounted in the case 1 at a high density, and the display 3 has a low profile, the space ensured for the base plate 123 and its peripheral portion is small. Hence, it is difficult to fix the opening/closing switch 122 in this space.

Figure 29:
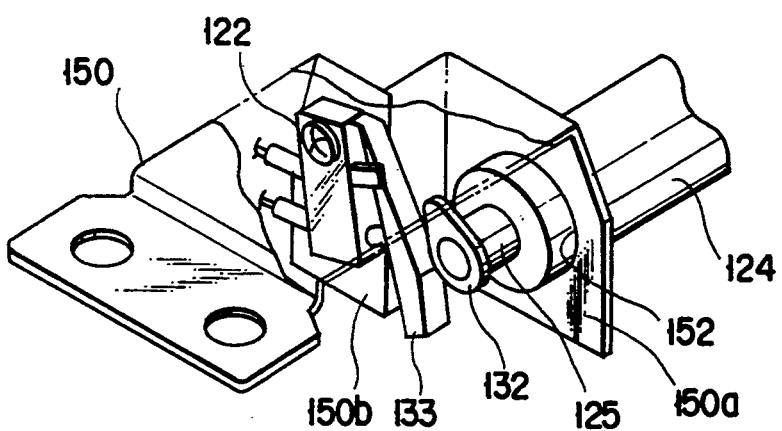

For this reason, as shown in FIGS. 1, 28, and 29, the upper case 1a has an elongated projection 131 extending from the rear end portion of the upper case 1 and located between the pair of leg portions 3a of the display 3. The distal end portion of the shaft 124 of each hinge 59 extends into the space in the projection 131 through the leg portion 3a. A cam 132 is fixed to the distal end of each shaft 124 through a support rod 125 to be freely pivoted together with the shaft 124. L-shaped support base plates 150 are disposed in the space in the projection 131 and are fastened to the inner surface of the upper case 1a with screws. Each support base plate 150 has a first vertical wall 150a adjacent/opposite to a corresponding one of the leg portions 3a of the display 3, and a second vertical wall 150b slightly spaced apart from the first vertical wall 150a toward the other hinge side. An opening/closing switch 122 having an armature 133 is fastened to the second vertical wall 150b with a screw. A through hole is formed in the first vertical wall 150a, and the distal end portion of the shaft 124 extends through the through hole. The cam 132 is located adjacent/opposite to the armature 133 of the opening/closing switch 122 and is pivoted upon interlocking with a pivot operation of the shaft 124, i.e., an opening/closing operation of the display 3, thereby ON/OFF-controlling the switch 122.

According to the above-described arrangement, the opening/closing switch 122 can be arranged by using the space in the projection 131 formed on the upper case 1a. In addition, the distal end portion of the shaft 124 of each hinge 59 extends through the through hole formed in the first vertical wall 150a of the support base plate 150 to be positioned at a predetermined position with respect to the switch 122. Therefore, the cam 132 can be held at an accurate position with respect to the armature 133 of the switch 122, and can accurately operate the switch 122 upon interlocking with an opening/closing operation of the display 3.

The present invention is not limited to the above-described embodiment. Various changes and modifications can be made within the spirit and scope of the invention. For example, the present invention is not limited to a portable computer but may be applied to other compact electronic devices such as a wordprocessor.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An electronic device comprising:
    a main body having a front portion which has a mounting surface;
    a keyboard detachably placed on the mounting surface and having a holding portion and upper surface;
    a member provided at the mounting surface for engaging the holding portion to hold the keyboard on the mounting surface, the member having an engagement portion and an abutment surface substantially flush with the upper surface of the keyboard placed on the mounting portion;
    a display having an inner surface with a display Section and connected to the main body to be rotatable between a closed position where the display covers the keyboard and an opened position where the keyboard is exposed, the display having an engaging portion for engaging the engagement portion of the member when the display is rotated in the closed position, and an inner surface for contacting the abutment surface when the display is rotated in the closed position.

2. A device according to claim 1, wherein the holding portion of the keyboard includes a through hole formed in the keyboard, and the member includes a projecting portion protruding from the mounting surface, for fitting into the through hole when the keyboard is placed on the mounting surface.

3. A device according to claim 2, wherein the engagement portion includes an engaging hole formed in the projecting portion, and the engaging portion includes a hook for fitting the encasing hole to lock the display rotated in the closed position.

4. An electronic device comprising:
    a main body having a front portion which has a mounting surface;
    a keyboard detachably placed on the mounting surface and having a holding portion; and
    a display connected to the main body to be rotatable between a closed portion where the display covers the keyboard and an opened position where the keyboard is exposed;
    a member provided at the mounting surface, for engaging the holding portion to hold the keyboard on the mounting surface, the member having an abutment portion for abutting the display to support the display when the display is rotated in the closed position.

5. A device according to claim 4, wherein the holding portion of the keyboard includes a through hole formed in the keyboard, and the member includes a projecting portion protruding from the mounting surface, for fitting into the through hole when the keyboard is placed on the mounting surface.

6. A device according to claim 4, wherein the display has an inner surface with a display section, and the abutment portion includes an abutment surface for contracting the inner surface of the display when the display is rotated in the closed position.

7. A device according to claim 6, wherein the keyboard has an upper surface which is substantially flush with the abutment surface when the keyboard is place on the mounting surface.

8. A device according to claim 4, wherein the member has an engagement portion, and the display has an engaging portion for engaging the engagement portion to lock the display when the display is rotated in the closed position.

9. A device according to claim 8, wherein the engagement portion includes an engaging hole formed in the member, and the engaging portion includes a hook for fitting the engaging hole.

* * * * *